United States Patent
Devitt et al.

(10) Patent No.: US 11,651,581 B2
(45) Date of Patent: *May 16, 2023

(54) SYSTEM AND METHOD FOR CORRESPONDENCE MAP DETERMINATION

(71) Applicant: Compound Eye Inc., Redwood City, CA (US)

(72) Inventors: Jason Devitt, Redwood City, CA (US); Haoyang Wang, Redwood City, CA (US); Konstantin Azarov, Redwood City, CA (US)

(73) Assignee: Compound Eye, Inc., Redwood City, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 17/246,235

(22) Filed: Apr. 30, 2021

(65) Prior Publication Data

US 2021/0256299 A1    Aug. 19, 2021

Related U.S. Application Data

(63) Continuation of application No. 17/104,898, filed on Nov. 25, 2020, now Pat. No. 11,030,478.

(60) Provisional application No. 63/072,897, filed on Aug. 31, 2020, provisional application No. 62/941,397, filed on Nov. 27, 2019.

(51) Int. Cl.
| | | |
|---|---|---|
| *G06V 10/77* | (2022.01) | |
| *G06V 10/75* | (2022.01) | |
| *G06N 3/08* | (2023.01) | |
| *G06F 18/213* | (2023.01) | |
| *G06V 10/82* | (2022.01) | |

(52) U.S. Cl.
CPC .......... *G06V 10/751* (2022.01); *G06F 18/213* (2023.01); *G06N 3/08* (2013.01); *G06V 10/7715* (2022.01); *G06V 10/82* (2022.01)

(58) Field of Classification Search
CPC ............. G06V 10/758; G06V 10/7715; G06V 10/751; G06V 10/82; G06K 9/6232; G06N 3/08
See application file for complete search history.

(56) References Cited

U.S. PATENT DOCUMENTS

| | | |
|---|---|---|
| 5,692,063 A | 11/1997 | Lee et al. |
| 5,875,264 A | 2/1999 | Carlstrom |
| 8,036,494 B2 * | 10/2011 | Chen ...................... G06T 7/215 382/300 |
| 8,644,620 B1 | 2/2014 | Lam |
| 9,123,118 B2 | 9/2015 | Ciurea et al. |
| 9,704,250 B1 | 7/2017 | Shah et al. |
| 10,339,631 B2 | 7/2019 | Price et al. |

(Continued)

OTHER PUBLICATIONS

Podder et al. ("Evolution of Visual Odometry Techniques," ARXIV (ID: 1804.11142), Apr. 30, 2018) (Year: 2018).

(Continued)

*Primary Examiner* — Ian L Lemieux
(74) *Attorney, Agent, or Firm* — Jeffrey Schox; Diana Lin

(57) ABSTRACT

A system and method for determining a correspondence map between a first and second image by determining a set of correspondence vectors for each pixel in the first image and selecting a correspondence vector from the set of correspondence vectors based on a cost value.

20 Claims, 15 Drawing Sheets

(56) References Cited

U.S. PATENT DOCUMENTS

| | | | |
|---|---|---|---|
| 10,528,844 | B2 | 1/2020 | Sugimura et al. |
| 10,762,655 | B1 | 9/2020 | Lindskog et al. |
| 10,764,561 | B1 | 9/2020 | Devitt |
| 2002/0097912 | A1* | 7/2002 | Kimmel .................. G06T 7/70 382/199 |
| 2004/0095999 | A1 | 5/2004 | Piehl et al. |
| 2004/0240725 | A1 | 12/2004 | Xu et al. |
| 2005/0140670 | A1 | 6/2005 | Wu et al. |
| 2005/0275660 | A1 | 12/2005 | Keller |
| 2007/0121998 | A1 | 5/2007 | Stein |
| 2007/0146232 | A1 | 6/2007 | Redert et al. |
| 2007/0229528 | A1* | 10/2007 | Keller .................. G06T 15/55 345/581 |
| 2008/0273751 | A1 | 11/2008 | Yuan et al. |
| 2009/0037491 | A1 | 2/2009 | Cachin et al. |
| 2010/0295926 | A1 | 11/2010 | Estrada et al. |
| 2011/0206236 | A1 | 8/2011 | Center |
| 2011/0273582 | A1 | 11/2011 | Gayko et al. |
| 2012/0050488 | A1 | 3/2012 | Cohen et al. |
| 2012/0250984 | A1 | 10/2012 | Taylor |
| 2012/0306847 | A1 | 12/2012 | Lim et al. |
| 2013/0266078 | A1 | 10/2013 | Deligiannis et al. |
| 2014/0105499 | A1 | 4/2014 | Shechtman et al. |
| 2014/0112572 | A1 | 4/2014 | Reif et al. |
| 2014/0160247 | A1 | 6/2014 | Shi et al. |
| 2015/0042766 | A1 | 2/2015 | Ciurea et al. |
| 2015/0348273 | A1 | 12/2015 | Chapiro et al. |
| 2016/0093056 | A1 | 3/2016 | Ouzounis |
| 2016/0196654 | A1 | 7/2016 | Aoki et al. |
| 2016/0267672 | A1 | 9/2016 | Ciurea et al. |
| 2017/0161912 | A1 | 6/2017 | Yoo et al. |
| 2017/0287169 | A1 | 10/2017 | Garcia |
| 2017/0327127 | A1 | 11/2017 | Simon |
| 2017/0343356 | A1 | 11/2017 | Roumeliotis et al. |
| 2018/0018805 | A1 | 1/2018 | Kutliroff et al. |
| 2018/0352213 | A1 | 12/2018 | Valentin et al. |
| 2019/0007673 | A1 | 1/2019 | Karvounis |
| 2019/0065868 | A1 | 2/2019 | Tran et al. |
| 2019/0164040 | A1 | 5/2019 | Naroditsky et al. |
| 2019/0180514 | A1* | 6/2019 | Sasaki ................ G02B 27/0101 |
| 2019/0279387 | A1 | 9/2019 | Liu et al. |
| 2019/0311485 | A1 | 10/2019 | Buczko et al. |
| 2020/0084427 | A1 | 3/2020 | Sun et al. |
| 2020/0349846 | A1 | 11/2020 | Siboni et al. |
| 2021/0021802 | A1 | 1/2021 | Devitt |
| 2021/0065379 | A1 | 3/2021 | Zhang et al. |
| 2021/0073953 | A1* | 3/2021 | Lee ..................... G06T 7/571 |

OTHER PUBLICATIONS

Rabe et al. ("Fast detection of moving objects in complex scenarios," Proc. IEEE Symp. Intelligent Vehicles, Jun. 2007) (Year: 2007).
Roberts et al. ("Learning general optical flow subspaces for egomotion estimation and detection of motion anomalies," IEEE Conference on Computer Vision and Pattern Recognition, Jun. 20-25, 2009) (Year: 2009).
Scaramuzza, Davide ("Visual Odometry [Tutorial]," IEEE Robotics & Automation Magazine, vol. 18, Is. 4, Dec. 2011) (Year: 2011).
Talukder et al. ("Real-time detection of moving objects from moving vehicles using dense stereo and optical flow," EEE/RSJ International Conference on Intelligent Robots and Systems, Sep. 28-Oct. 2, 2004) (Year: 2004).
Zhang et al. ("Visual odometry for the Autonomous City Explorer," IEEE/RSJ International Conference on Intelligent Robots and Systems, Oct. 10-15, 2009) (Year: 2009).
"Low-discrepancy sequence", https://en.wikipedia.org/wiki/Low-discrepancy_sequence.
"Stereo Visual Odometry", Viulib-Vicomtech Solutions, https://www.viulib.org/solutions/s5/stereo_visual_odometry.
Banz, C., et al., "Evaluation of Penalty Functions for Semi-Global Matching Cost Aggregation", Int. Arch. Photogramm. Remote Sens. Spatial Inf. Sci. 2012.
Banz, C., et al., "Real-time stereo vision system using semi-global matching disparity estimation: Architecture and FPGA-implementation", in 2010 International Conference on Embedded Computer Systems: (IEEE, 2010).
Baraldi, Patrizia , et al., "Motion and Depth from Optical Flow", AVC 1989 doi:10.5244/C.3.35.
Barron, J.L., et al., "Performance of Optical Flow Techniques", IJCV 12:1, pp. 43-77, 1994.
Beall, Chris , "Stereo Visual Odometry", CVPR 2014 Visual SLAM Tutorial, Georgia Tech, Institute for Robotics and Intelligent Machines.
Bleyer, M., et al., "PatchMatch Stereo—Stereo Matching with Slanted Support Windows", in Proceedings of the British Machine Vision Conference 2011 14.1-14.11 (British Machine Vision Association, 2011). doi:10.5244/C.25.14.
Bleyer, Michael , et al., "PatchMatch Stereo—Stereo Matching with Slanted Support Windows", Patchmatch Stereo, 2011.
Bleyer, Michael , et al., "Stereo Matching—State-of-the-Art and Research Challenges", In book: Advanced Topics in Computer Vision (pp. 143-179) Publisher: Springer, Jan. 2013.
Boukamcha, Hamdi, et al., "Robust auto calibration technique for stereo camera", International Conference on Engineering & MIS (ICEMIS), Monastic Tunisia, 2017, pp. 1-6, doi: 10.1109/ICEMIS.2017.8272992, https://ieeexplore.eee.org/document/8272992.
Chang, J.R., et al., "Pyramid Stereo Matching Network", arXiv:1803.08669 [cs] (2018).
Cormack, Lawrence K., et al., "Binocular Mechanisms of 3D Motion Processing", https://www.ncbi.nlm.nih.gov/pmc/articles/PMC5956901/.
Cvisic, Igor, et al., "Stereo odeemetry based on careful feature selection and tracking", IEEE 2015, www.cvlibs.net/datasets/kitti/eval_odometry.php.
Dang, Thao , et al., "Continuous Stereo Self Calibration by Camera Parameter Tracking", IEEE Transactions on Image Processing, vol. 18, No. 7, Jul. 2009.
Distler, Jonathan , "How to Know if Stereo Camera Lose Calibration", https://www.foresightauto.com/how-to-know-if-stereo-cameras-lose-calibration/. Aug. 27, 2020.
Fucek, Luka , et al., "Dense Disparity Estimation in Ego-motion Reduced Search Space", Computer Science, Engineering, ArXiv, published 2017, https://arxiv.org/pdf/1708.06301.pdf.
Geiger, A., et al., "Efficient Large-Scale Stereo Matching, in Computer Vision", ACCV 2010 (eds. Kimmel, R., Klette, R. & Sugimoto, A.) vol. 6492 25-38 (Springer Berlin Heidelberg, 2011).
Godard, C., et al., "Unsupervised Monocular Depth Estimation with Left-Right Consistency", arXiv:1609.03677 [cs, stat] (2017).
Haizitheodorou, M., et al., "Stereo Matching Using Optic Flow", American College of Greece, 2000, Academic press, 16 pages.
Hemayed, Elsayed E., et al., "A Survey of Camera Self-Calibration", Proceedings of the IEEE Conference on Advanced Video and Signal Based Surveillance, 2003.
Hirschmuller, H., "Stereo Processing by Semiglobal Matching and Mutual Information", IEEE Trans. Pattern Anal. Mach. Intell. 30, 328-341 (2008).
Hsiung, Jerry , et al., "Information Sparsification in Visual-Inertial Odometry", Conference Paper, Proceedings of (IROS) IEEE/RSJ International Conference on Intelligent Robots and Systems, pp. 1146-1153, Oct. 2018.
Jonschkowski, Rico , et al., "What Matters in Unsupervised Optical Flow", arXiv:2006.04902v2 [cs.CV] Aug. 14, 2020.
Kendall, A., "End-to-End Learning of Geometry and Context for Deep Stereo Regression", arXiv:1703.04309 [cs] (2017).
Kendall, Alex , et al., "End-to-End Learning of Geometry and Context for Deep Stereo Regression", arXiv:1703.04309v1 [cs.CV] Mar. 13, 2017.
Laga, H., et al., "A Survey onDeep Learning Techniques for Stereo-based Depth Estimation", arXiv:2006.02535 [cs] (2020).
Lai, Hsueh-Ying , et al., "Bridging Stereo Matching and Optical Flow via Spatiotemporal Correspondence", 2019 IEEE/CVF Conference on Computer Vision and Pattern Recognition (CVPR), Jun. 15-20, 2019, https://ieeexplore.ieee.org/document/8953227.

(56) References Cited

OTHER PUBLICATIONS

Lee, D.J., et al., "Hardware Implementation of a Spline-Based Genetic Algorithm for Embedded Stereo Vision Sensor Providing Real-Time Visual Guidance to the Visually Impaired", EURASIP J. Adv. Signal Process. 2008.
Marr, D., et al., "Cooperative Computation of Stereo Disparity", Science 194, 283-287 (1976).
Mentzer, Nico, et al., "Self-Calibration of Wide Baseline Stereo Camera System for Automative Applications", In book: Towards a Common Software/Hardware Methodology for Future Advanced Driver Assistance Systems. The DESERVE Approach (pp. 157-200)Chapter: Self-Calibration of Wide Baseline Stereo Camera Systems for Automotive ApplicationsPublisher: River Publisher.
Mourikis, Anastasios I., et al., "A Multi-State Constraint Kalman Filter for Vision-aided Inertial Navigation", Proceedings 2007 IEEE International Conference on Robotics and Automation, Apr. 10-14, 2007, https://www-users.cs.umn.edu/~stergios/papers/ICRA07-MSCKF.pdf.
Muhovic, Jon, et al., "Correcting Decalibration of Stereo Cameras in Self-Driving Vehicles", Sensors 2020, 20,3241; doi:10.3390/s20113241, ww.mdpi.com/journal/sensors.
Nie, Y., et al., "Adaptive rood pattern search for fast block-matching motion estimation", IEEE Transactions on Image Processing (2002).
Ozuysal, Mustafa, "Manual and Auto Calibration of Stereo Camera Systems", Thesis submitted to the Graduate School of Natural and Applied Sciences of Middle East Technical University, Aug. 2004.
Park, Jinsun, et al., "Non-Local Spatial Propagation Network for Depth Completion", arXiv:2007.10042v1 [cs.CV] Jul. 20, 2020.
Psarakis, E.Z., "An enhanced correlation-based method for stereo correspondence with subpixel accuracy", in Tenth IEEE International Conference on Computer Vision, vol. 1, pp. 907-912.
Rahnama, O., et al., "Real-Time Dense Stereo Matching With ELAS on FPGA Accelerated Embedded Devices", IEEE Robot. Autom. Lett. 3, 2008-2015 (2018).
Rong, G., et al., "Variants of Jump Flooding Algorithm for Computing Discrete Voronoi Diagrams", in Proceedings of the 4th International Symposium on Voronoi Diagrams in Science and Engineering 176-181 (IEEE Computer Society, 2007).
Rossi, M., et al., "Joint Graph-Based Depth Refinement and Normal Estimation", in 2020 IEEE/CVF Conference on Computer Vision and Pattern Recognition 12151-12160 (IEEE, 2020).
Scaramuzza, Davide, et al., "Visual-Inertial Odometry of Aerial Robots", Springer Encyclopedia of Robotics, 2019.
Scharstein, D., "A taxonomy and evaluation of dense two-frame stereo correspondence algorithms", in Proceedings IEEE Workshop on Stereo and Multi-Baseline Vision (SMBV 2001) 131-140 (IEEE Comput. Soc, 2001).
Sivaraj, Hemanthkumar, et al., "Random Walk Based Heuristic Algorithms for Distributed Memory Model Checking", Electronic Notes in Theoretical Computer Science 89, No. 1 (2003) 17 pages URL: http://elsevier.nl/locate/entcs/volume89.html, Year: 2003).
International Search Report and Written Opinion for Application No. PCT/US2021/014459 dated Jun. 22, 2021.
Knoblauch, Daniel, et al., "Factorization of Correspondence and Camera Error for Unconstrained Dense Correspondence Applications", UC Davis, IDAV Publications, 2009.

* cited by examiner

SYSTEM AND METHOD FOR CORRESPONDENCE MAP DETERMINATION

CROSS-REFERENCE TO RELATED APPLICATIONS

This application is a continuation of U.S. patent application Ser. No. 17/104,898 filed 25 Nov. 2020, which claims the benefit of U.S. Provisional Application No. 62/941,397, filed 27 Nov. 2019 and U.S. Provisional Application No. 63/072,897, filed 31 Aug. 2020 all of which is incorporated in its entirety by this reference.

TECHNICAL FIELD

This invention relates generally to the image processing field, and more specifically to a new and useful system and method in the image processing field.

BACKGROUND

Comparison of two images to determine scene geometry or motion is desirable in many applications due to the prevalence and commercial availability of cameras. However, conventional methods either output sparse correspondence maps that do not provide sufficient informational density for these applications, or are resource intensive and slow, rendering them impractical for applications that require real- or near-real time geometry or optic flow estimation.

Thus, there is a need in the image processing field to create a new and useful system and method for correspondence searching. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 2:
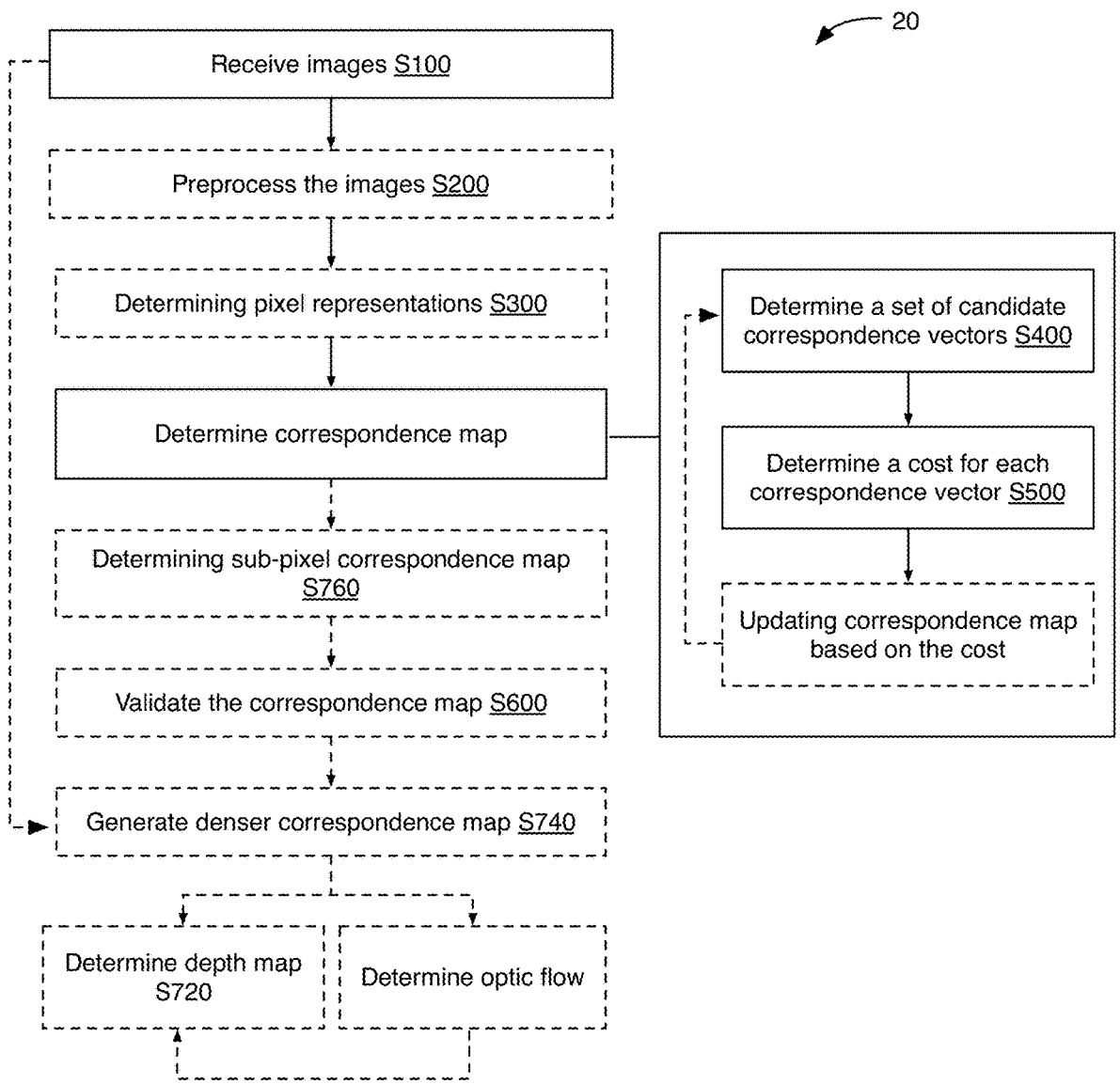
FIG. 2 is a schematic representation of the method.

As shown in FIG. 2, the method can include: receiving images S100 and determining a correspondence map between the images. Determining the correspondence map can include: determining a set of correspondence vectors S400, determining a cost associated with each correspondence vector S500, and updating the correspondence map based on the cost. Optionally, the method can include: preprocessing the images S200, determining pixel representations for pixels in each image S300, validating the correspondence map S600, postprocessing the correspondence map S700, and/or any suitable steps.

The method functions to determine a correspondence map relating pixels from two or more images that depict the same points of a common scene. The resultant correspondence map is preferably dense (e.g., include valid correspondence vectors for more than a threshold proportion of pixels, such as >10%, >25%, >50%, >75%, >90%, and/or ranges therebetween), but can alternatively be semi-dense, sparse, or have any other suitable density.

The technology can be used with featureless or near featureless scenes (e.g., feature density approximately 0), low feature density scenes (e.g., feature density less than about 1000 points per megapixel), and/or high feature density scenes (e.g., feature density greater than about 1000 points per megapixel).

In specific variants, the technology can be used for (e.g., output) motion detection, video interpolation, video compression, video editing, depth estimation (e.g., stereo depth estimation, depth from optical flow), camera calibration, navigation, visual odometry, mapping and localization, object tracking, object detection, 3D reconstruction from images, ego-motion estimation, and/or for any suitable application.

2. Benefits

Variations of the technology can confer several benefits and/or advantages.

First, variants of the technology can enable and/or ensure that a correspondence map generated between two images is deterministic (e.g., the resulting correspondence map will be the same for the same two images each time the correspondence map is generated), which can be particularly, but not exclusively, important for applications that require a high level of safety (e.g., automotive, robotics, etc.). In specific examples, the use of deterministic low-discrepancy sequences (e.g., sometimes referred to as 'quasi-random;' as opposed to random or pseudorandom sequences) to generate a pixel representation, initialize correspondence vectors, and/or generate candidate correspondence vectors can enable the deterministic correspondence map generation.

Second, variants of the technology can simplify the calculations used to generate a correspondence map (e.g., disparity map, optic flow), which can save processing time and processing resources (e.g., memory and/or processing power). For example, this can be achieved by: using modern processors (e.g., on-board computing systems, edge computing systems), using bit-hashes as the pixel representation (e.g., instead of integer values or float values), using the Hamming distance to calculate the correspondence vector cost, generating sub-pixel-refined correspondence maps from a predetermined integer-accurate correspondence map, calculating pixel representations on demand (e.g., for sub-pixel refinement), not building a cost volume, excluding a global optimization step, decoupling the parameters from the scene's features, and/or otherwise achieved.

Third, variants of the technology can enable a dense correspondence between pixels in two images.

Fourth, variants of the technology can determine the correspondence map between stereo images even if the images are not rectified. For example, the correspondence between the images can be resolved by using two-dimensional correspondence vectors (e.g., comparing pixels from different rows and/or columns). In specific examples, correspondence over a significant portion of the image (e.g., over more than 1/10, 1/8, 1/4, 1/2, 3/4, etc. of the image) can be provided; however, correspondence over any suitable portion(s) of the images can be obtained.

Fifth, variants of the technology can enable real- or near-real time determination of which pixels correspond between images (e.g., pixel matches between the images). In specific examples, the use of a set of candidate correspondence vectors (e.g., as opposed to testing all possible correspondence vectors) and the parallelizability of evaluating the candidate correspondence vectors (e.g., for all pixels at substantially the same time) can ensure that pixel correspondence can be rapidly and accurately determined.

Sixth, variants of the technology can be tuned for a variety of different applications. In specific examples, the amount of time the algorithm requires to run and the accuracy of the correspondence map (e.g., disparity map, optic flow, etc.) can be tuned by modifying one or more of the frame rate, the image resolution, the number of iterations, the size and/or number of nearest neighbors that are searched and/or used for interpolation (e.g., $1^{st}$ nearest neighbors, $2^{nd}$ nearest neighbors, $3^{rd}$ nearest neighbors, etc.; along pixel rows; along pixel columns; along the diagonal; etc.), the number of propagation steps, the pixel representation, the cost metric, and/or using any suitable parameters.

However, variants of the technology can confer any other suitable benefits and/or advantages.

3. System

Figure 1:
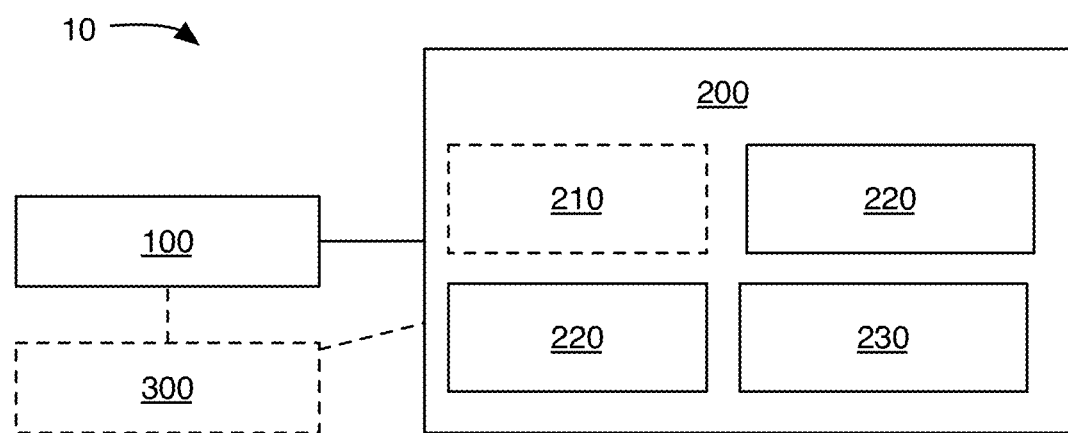
FIG. 1 is a schematic representation of the system.

The method can be performed using a system 10, which can include: an image acquisition system and a computing system (example shown in FIG. 1). The computing system preferably includes a pixel representation module; a cost module; a correspondence vector module; optionally, an image rectification module; optionally, a processing module; a housing; and/or any suitable components. However, the method can be performed with any other suitable system.

In specific examples, one or more instances of the system can be mounted to or integrated within an external system, wherein the external system can use the system outputs (e.g., for navigation, localization, etc.). The external system can be: a vehicle, such as an automobile, nautical craft, aircraft, or other vehicle; a robot; a navigation system; a monitoring system (e.g., closed-circuit television, camera monitoring system, etc.); and/or other system. However, the system can be a standalone system, a retrofit system, and/or any other suitable system.

The components of the system are preferably colocalized (e.g., arranged in or mounted to the same housing 300, arranged on the same external vehicle, etc.), but can alternatively be physically disperse (e.g., remote from each other).

The image acquisition system 100 functions to acquire one or more images. The images can be: still frames (e.g., photographs), video frames, or other images. The image acquisition system is preferably connected to the computing system; however, the image acquisition system can be in communication (e.g., wireless, wired, etc.) with the computing system and/or can interface with the computing system in any suitable manner.

The image acquisition system is preferably configured to capture a set of images, wherein the image set preferably includes at least two images, but can alternatively include a single image or any other suitable number of images. The two images preferably have overlapping fields of view (e.g., different points-of-view of a scene, a scene at different times, a scene where the image acquisition system has moved between shots, etc.); however, the images can be otherwise related. The two images (e.g., first image and second image) can be acquired in any order (e.g., first image can be acquired before the second image, second image can be acquired before the first image, images can be acquired concurrently or contemporaneously) and/or in any orientation (e.g., first image to the left of the second image, first image to the right of the second image, first image above the second image, first image below the second image, etc.). In a specific example, the first and second images can be consecutive frames of a video (e.g., frames acquired at time t and t+1, frames acquired with any suitable number of intermediate frames such as at time t and t+N). In a second specific example, the first and second images can be stereoscopic images. However, the two images can be any suitable images.

The images within the image set are preferably each described by a set of image parameters (e.g., set by the camera(s), set by processing at a computing system, etc.); however, the image parameters can be described in any suitable manner. The set of image parameters can include frame rate, resolution, color space (e.g., RGB, greyscale, YUV, HSL, HSV, etc.), pixel size, number of pixels, feature or point density, timestamp, and/or any suitable image parameters. The frame rate is preferably at least 1 frame per 33 ms; however, any suitable frame rate can be used. In specific examples, the frame rate can depend on the speed at which the image acquisition system (and/or objects in the scene) are moving; however, any suitable frame rate can be used. In specific examples, the image resolution can be a common image resolution such as video graphics array (VGA), an uncommon image resolution, and/or any suitable image resolution. The two or more images preferably share the same set of image parameters; however, one or more image parameters can be different between the images. The image parameters can be static or variable (e.g., selected based on operation conditions). The images can be captured by the same or different camera(s).

Each image preferably includes a set of pixels (e.g., with pixel values), but can alternatively include an array of pixel intensity changes, a series of pixel intensities, or be otherwise constructed. Each pixel is preferably identified by a pixel coordinate within the image or camera frame (e.g., horizontal position and vertical position), but can be identified by an alphanumeric identifier (e.g., sequential identifier), or otherwise identified. Each pixel is preferably associated with a set of pixel parameters (e.g., optical parameter, optical characteristics, electromagnetic parameters, etc.), determined from the signal sampled by the corresponding camera sensor. Examples of pixel parameters can include: intensity (e.g., of a given color channel, of a given color, overall, etc.), hue, saturation, lightness, gradient (e.g., between adjacent pixels), wavelength, frequency, and/or other visual characteristics; distance from an image edge; and/or other parameters. However, the pixels can be otherwise characterized.

Descriptions of individual pixels herein (such as pixel representation determination, correspondence vector determination, and/or other descriptions) can additionally or alternatively apply to individual sets of pixels (e.g., pixel sets). A set of pixels (e.g., pixel set) can include: a cluster of pixels, such as pixels in a given grid or region; pixels that share one or more pixel parameters or characteristics such as intensity, intensity in a given color channel, or other characteristics; pixels that are associated with a common feature or segment of an image; a superpixel; a block of pixels; spatially proximal or adjacent pixels; and/or otherwise defined.

The image acquisition system can include one or more cameras 150, inertial sensors (e.g., IMU, accelerometer, gyroscope, etc.), altimeters, magnetometers, auxiliary depth sensors (e.g., time of flight sensors), acoustic sensors, and/or other components. The image acquisition system preferably includes two or more cameras 150 (e.g., 3, 5, 10, 30, etc.); however, additionally or alternatively, the image acquisition system can include a single camera (e.g., configured to capture video, configure with variable apertures, configured to capture images of distinct portions of a scene on the camera sensor, configured to capture images from different positions, etc.). The cameras can be digital cameras, SLR cameras, thermal cameras, optical cameras, infrared cameras, low light cameras, x-ray detectors, ultraviolet cameras, global shutter cameras, rolling shutter cameras, event cameras, neuromorphic imagers, and/or any suitable camera technology.

The camera(s) can be semi-rigidly mounted (e.g., fixed such that during normal operation they reorient and/or move by less than 1°, 2°, 5°, 10°, etc. pixel dimensions such as length and/or width), rigidly mounted (e.g., during normal operation, the camera and/or sensor elements of the camera move by less than 1 pixel dimension), loosely mounted, actuatably mounted (e.g., mounted to a movable arm or a track), unmounted (e.g., freehand), and/or mounted in any suitable manner. The cameras are preferably mounted to each other (e.g., via an intermediary housing, mounting substrate, bar, etc.), but can alternatively be mounted to a common mounting surface (e.g., an external system), or other surface.

The separation between the camera(s) (e.g., between two cameras, between images captured with one camera wherein the camera has moved between the image acquisition, etc.) is preferably known; however, the separation can be unknown (e.g., in variants configured to determine odometry). In specific examples, the separation distance is preferably chosen such that the pairwise images overlap by at least ¼ of the images' view; however, the two or more images or captured frames can be otherwise related.

The computing system 200 preferably functions to determine a correspondence map based on the images. The computing system can be local (e.g., integrated into the image acquisition system, integrated into an external system, separate component, etc.), remote (e.g., server, cloud, etc. in communication with the image acquisition system), distributed, and/or arranged in any suitable manner. The computing system can include one or more: GPUs, CPUs, TPUs, microprocessors, and/or any other suitable processors; local memory (e.g., volatile or nonvolatile, RAM, flash, etc.); and/or any other suitable processing components. The computing system can include (and/or a non-volatile computer readable medium can store instructions for) a pixel representation module 220; a cost module 230; a correspondence vector module 240; optionally, a processing module 210; and/or any suitable components.

The pixel representation module 220 (e.g., image hashing module) preferably functions to convert each pixel of each image into a representation, where the representation facilitates comparison of pixels in the first and second image. The pixel representation and/or properties thereof (e.g., size, format, etc.) can depend on an image parameters (e.g., image resolution, number of pixels, frame rate, etc.), an application, a number of iterations (e.g., target number of iterations), a target correspondence map quality, and/or any suitable information. The pixel representation can be a hash (e.g., a binary hash), an encoding (e.g. by a neural network, a hand-crafted feature descriptor such as scale-invariant feature transform (SIFT) descriptors, etc.), a fingerprint, and/or be any suitable representation. The pixel representation can be integer-valued, floating-valued, binary, and/or have any suitable format. The pixel representation can be a string, a scalar, a vector, a matrix, and/or have any format. However, the image(s) and/or pixels can be used raw (e.g., the pixel representation can be a pixel property) and/or converted to any suitable data structure.

Each pixel (e.g., defined by a pixel index, defined by a pixel number wherein each pixel is associated with a specific pixel number, etc.) within each image is preferably associated with a pixel representation; however, a pixel representation can correspond to a set of pixels.

The pixel representation is preferably determined based on the pixel parameters for the pixel, the pixel parameters for neighboring pixels (e.g., representation pixels within a pixel patch, representation pixels within a block of pixels), and/or any other information. In some variants, each pixel from each image can correspond to more than one pixel representation. For example, each pixel can have: a greyscale and a color bit string, a greyscale bit string and a specific color channel bit string, more than one greyscale bit string, more than one color bit string, and/or any other suitable combination of pixel representations. In a second example, each pixel can have a binary hash and an integer-valued (e.g., non-binary) hash. In this example, the binary hash and integer valued hash can be determined from the same pixel parameter (e.g., both generated from a grayscale image, both generated from a color channel, etc.), or different pixel parameters. However, each pixel can have any suitable representation(s).

The pixel representation is preferably generated as described in the method (e.g., during S300); however, the pixel representation can be determined in any suitable manner.

The correspondence vector module 240 (correspondence map module) can function to determine correspondence vectors for each pixel. The correspondence vector module can: initialize the correspondence map (e.g., disparity map, optic flow, optical flow, binoptic flow, etc.), update the correspondence map, determine a set of correspondence vectors associated with an analysis pixel, and/or perform any suitable function.

The correspondence map preferably includes a set of correspondence vectors (e.g., disparity vectors, optic flow vectors, etc.). The correspondence vectors preferably map each analysis pixel from the analysis image to a distinct corresponding pixel in the corresponding image; however, two or more analysis pixels can be mapped to the same corresponding pixel, an analysis pixel can be mapped to two or more corresponding pixels, and/or any suitable assignment between pixels can be made.

Each correspondence vector is preferably associated with a pixel (e.g., an analysis pixel) of the analyzed image, but can additionally or alternatively be associated with a pixel set and/or any other suitable image portion. Each correspondence vector identifies a corresponding segment in the other image. The corresponding segment can be: a pixel, a pixel patch, a sub-pixel increment, and/or any other suitable image segment. Each correspondence vector preferably identifies a single corresponding segment, but can alternatively identify multiple corresponding segments, no corresponding segment, and/or any other suitable number of corresponding segments.

Each correspondence vector preferably represents an analysis segment's (e.g., analysis pixel's) distance away from a corresponding segment in the corresponding image (e.g., difference in pixel coordinates between the corresponding pixel and the analysis pixel), but can alternatively represent the corresponding segment's coordinates, or be otherwise constructed.

Each correspondence vector can be a singleton (e.g., a pixel number in variants where each pixel each image is associated with a unique pixel number; a single value corresponding to a pixel in the other image along a row, column, etc.; etc.), a 2-tuple (e.g., an ordered pair encoding the difference in horizontal and/or vertical coordinates of the corresponding pixel in the corresponding image), 3-tuples (e.g., a triplet identifying a specific pixel index and camera, a specific pixel index and frame, specific pixel index and depth, specific pixel index and timestamp, etc.), and/or any suitable format. However, each correspondence vector can be otherwise defined. Each correspondence vector preferably maps the pixels in one image to a unique pixel in the corresponding image (e.g., the correspondence vector is locally unique); however, the correspondence vectors (and/or a subset thereof) can map one or more analysis pixels from an analyzed image to the same pixel in the corresponding image.

The correspondence vectors can be integer-valued (e.g., map the analysis pixel directly to a pixel of the corresponding image), floating-valued (e.g., map or align the analysis pixel to a subpixel correspondence of the corresponding image), or otherwise valued. The correspondence vectors are preferably signed (e.g., include + and −), but can alternatively be unsigned. However, the correspondence vector can have any other suitable value, or represent any other suitable information. In a first specific example, the correspondence vectors can be associated with a change in time (e.g., a timestep), such that the mapping from a pixel in one image corresponds to a pixel in the corresponding image at a different time (e.g., the image and corresponding image are successive frames). The change in time can be associated with a frame rate, a time stamp (e.g., difference in time stamp) between the images, and/or any suitable time difference. In these variants, the set of pixels associated with respective correspondence vectors can cooperatively form an optical flow map, optical flow field, or binoptic flow.

In a second specific example, the correspondence vectors (and underlying images or frames) can be associated with a single timestep. In these variants, the set of pixels associated with respective correspondence vectors can cooperatively form a disparity map. However, the correspondence vectors can cooperatively form any suitable correspondence map.

The cost module 230 (e.g., pixel matching module) preferably functions to determine a cost value (e.g., distance, difference) between an analysis pixel of an analyzed image and a corresponding pixel in the corresponding image. The cost module can function to determine a quality of a match for each correspondence vector (e.g., initial correspondence vector, updated correspondence vector, etc.), select a correspondence vector candidate based on the cost, update the correspondence map (e.g., based on the cost value or a quality of the correspondence vectors), and/or determine when a suitable number of correspondence vectors have a target quality (e.g., high quality, good quality; have a score that satisfies a matching criteria; are validated).

The cost module preferably determines (e.g., calculates, selects, etc.) a cost value of a cost metric (e.g., distance metric). Examples of cost metrics that can be used include: the Hamming distance, the sum of squared difference (SSD), the sum of absolute difference (SAD), the mean absolute error, mean squared error, Euclidean distance, Manhattan distance, Chebyshev distance, Minkowski distance, Canberra distance, cosine distance, Pearson's distance, Levenshtein distance, edit distance, Jaro-Winkler distance, and/or other distance metric. The distance metric can be predetermined, learned from data (for example using a neural network or other machine learning algorithm), and/or otherwise selected. The cost module (or different instances of the cost module) can use the same or different distance metric for different method steps.

The cost value is preferably determined based on the pixel representations of the analysis pixel and corresponding pixel (identified by the correspondence vector), but can alternatively be determined based on the values of the pixel parameters or any other suitable characteristic.

In a first specific example, the cost module can determine a Hamming distance between a binary hash of an analysis pixel and a binary hash associated with a corresponding pixel. In a second specific example, the cost module can determine a sum of squared differences between an integer-valued hash associated with an analysis pixel and an integer-valued hash associated with a corresponding pixel. In a third specific example, the cost module can determine a sum of squared differences between an integer-valued hash associated with an analysis pixel and an integer-valued hash associated with pixels adjacent to the corresponding pixel. However, any suitable matching criteria can be used. In a second example, the cost can be determined (e.g., classified, calculated, etc.) using a neural network, wherein the pixel representation of the analysis pixel and corresponding pixels are fed into the neural network. However, the cost value can be otherwise determined.

The cost module preferably stores the correspondence vector associated with the lowest cost value for each analysis pixel in association with the analysis pixel (e.g., in association with a pixel identifier, at a location within an array corresponding to the pixel, in association with the pixel's bit string, in association with the pixel's correspondence vector, etc.) in a correspondence map. The cost value associated with the correspondence vector can optionally be stored. However, the cost module can store each cost value and correspondence vector associated with the analysis pixel, and/or can store any suitable information.

In specific examples, the cost module can cease operation (e.g., stop comparing pixels, stop updating the correspondence map, etc.) based on one or more stop conditions. The stop condition can include: a threshold number of iterations (e.g., number of cycles of updating the correspondence map and/or correspondence vectors), a threshold number of changes in the correspondence map, a threshold number of high quality correspondence vectors, a threshold number of null value correspondence vectors, a threshold number of low quality correspondence vectors, a predetermined amount of time, the average or median cost falls below a threshold, and/or any suitable stop condition. After the cost module has stopped, the cost module can store the updated correspondence map. However, the cost module can stop at any suitable time.

In specific examples, the cost module can validate the correspondence map by comparing a correspondence map (e.g., updated correspondence map, intermediate correspondence map, final correspondence map) with a second correspondence map (e.g., determined for the corresponding image, compared to the first image, starting from a second initial correspondence map). The correspondence maps to be compared can be determined in series and/or parallel. In these variants, when the correspondence maps (or portions thereof) match, the cost module can store a validated correspondence map. The validated correspondence map preferably includes those correspondence vectors that map the same pixels between the first and second image, but can include any suitable correspondence vector(s).

When the correspondence vectors do not match, the cost module can set the non-matching correspondence vectors to a null value, determine an additional correspondence map (e.g., using a different initialization), discard the images, repeat the correspondence map generation method (e.g., with a new initialized state), and/or otherwise manage the unvalidated correspondence maps. However, the cost module can validate the correspondence maps in any suitable manner.

In embodiments of the system including one or more processing modules 210 (e.g., pre-processing module, post-processing module, etc.), the processing module can function to clean up the image(s) (e.g., remove saturated pixels, remove non responsive pixels, filter images, etc.), remove outliers from the correspondence map, process the correspondence map (e.g., generate one or more outputs based on the correspondence map such as depth maps, feature identification, odometry, etc.; improve a quality (e.g., completeness, accuracy, density, etc.) of the correspondence map (or a derivative thereof); classify one or more features in the correspondence map and/or images; and/or perform any suitable function.

In specific variants, the processing module can include an image rectification module, the image rectification module preferably functions to rectify (and/or partially rectify) the two or more images prior to performing pixel matching. The image rectification module can use the correspondence map from a prior timestep (e.g., previously measured correspondence map for the image acquisition system), calibration parameters, and/or other suitable measurements to translate and/or transform images so that the horizontal pixels in the image are aligned to nearly the same position (e.g., differ by <1 pixels, <5 pixels, <10 pixels, <50 pixels, <100 pixels, <¼ total number of vertical pixels, etc.). However, vertical pixels can be aligned between images and/or images can be rectified in any suitable manner.

In a second variant, the processing module can include a depth map module which functions to determine a depth map from the correspondence map (e.g., disparity map, optic flow, etc.). The depth map is preferably calculated based on the correspondence map (e.g., validated correspondence map) and the image acquisition system (e.g., a camera separation between the first and second image, an external system pose, an external system kinematics, an image acquisition system kinematics, etc.). In an illustrative example, the depth map can be calculated according to:

$$D = \frac{fB}{corr}$$

where D is the distance from the image acquisition system to the object, f is a focal length of the image acquisition system in pixels, B is a baseline of the image acquisition system, and corr is the length of the correspondence vector in pixels. However, the depth map can be otherwise generated.

Figure 10:
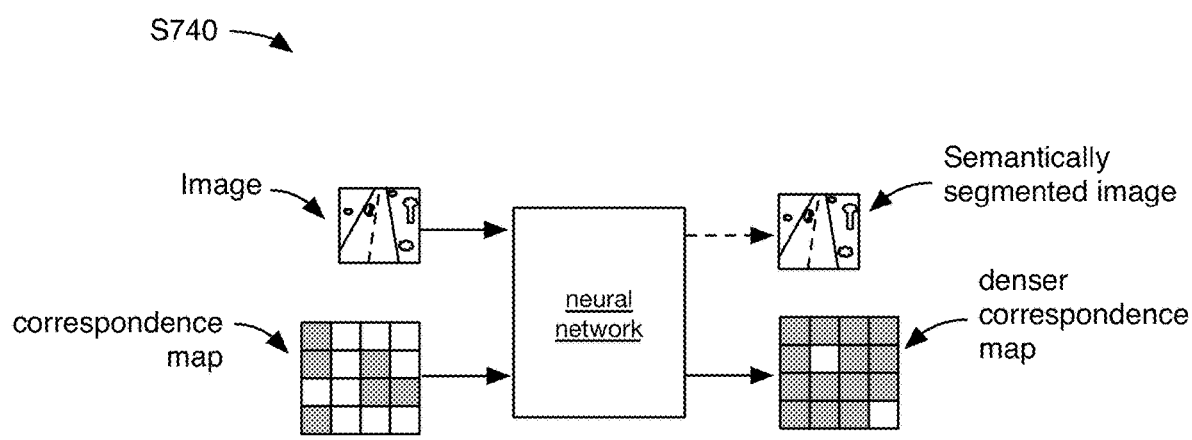
FIG. 10 is an illustrative example of using a neural network to fill gaps in a depth map and, optionally, generate a semantic segmentation of the original image.

In a third variant, the processing module can include a machine learning module that functions to complete a correspondence map (or depth map) and/or classify (or segment) an image. The machine learning module preferably includes a neural network (e.g., a convolutional neural network, deep neural network, nonlocal neural network, recursive neural network, etc.), but can additionally or alternatively include a genetic algorithm, Bayesian optimization, geometry networks, context networks, and/or using any suitable machine learning process. The machine learning module can include a single neural network, an ensemble of neural networks, a cascade of neural networks, and/or any other suitable set of neural networks. As shown in FIG. 10, inputs to the neural network can include one or more images (e.g., first and/or second image, an image used to determine the correspondence map, an auxiliary image concurrently sampled with an image used to determine the correspondence map, etc.), a depth map (e.g., incomplete depth map, depth map that includes gaps, etc.), a correspondence map (e.g., validated correspondence map, intermediate correspondence map, optic flow, disparity map, etc.), image acquisition system properties (e.g., calibration, pose, kinematics, etc.), user-provided information, auxiliary sensor information, and/or any suitable inputs. Outputs of the neural network can include a segmentation of the image(s) (e.g., semantic segmentation, instance-based segmentation), a completed depth map (e.g., a depth map with fewer or no gaps), a completed correspondence map, and/or any suitable information. In a fourth variant, the processing module can include a sub-pixel matching module that functions to refine a correspondence vector by determining sub-pixel correspondences (e.g., floating correspondence vector). This variant can be particularly, but not exclusively, useful for objects in the scene that are far from the image acquisition system (e.g., correspondence vector close to 0).

4. Method

As shown in FIG. 2, the method can include: receiving images S100 and determining a correspondence map between the images. Determining a correspondence map can include: determining a set of correspondence vectors S400, determining a cost for each correspondence vector S500, and updating the correspondence map based on the cost. Optionally, the method can include: preprocessing the images S200, determining pixel representations for pixels in each image S300, validating the correspondence map S600, post-processing the correspondence map S700, and/or any suitable steps.

The method can be performed in real- or near-real time (e.g., as images are acquired, for each image pair, as video frames are acquired, etc.), within a predetermined time from image capture (e.g., between 1 millisecond and 10 seconds, 30 milliseconds, 1 second, 10 seconds, etc.), at a delayed time (e.g., images are stored to be processed later), and/or at any suitable time.

The method and/or steps thereof can be performed in parallel and/or in series for one or more: images from the same or different systems, images from the same or different timesteps, pixels of the same or different image, and/or any other data structure.

In embodiments, the method and/or steps thereof can be iteratively performed (e.g., for each analysis pixel, for each pixel of the analysis image, etc.) for the image (and/or for a video) until one or more stop conditions are met. The stop condition can include: a threshold number of iterations (e.g., number of cycles of updating the correspondence map and/or correspondence vectors, number of iterations of S400 and S500, etc.), a threshold (e.g., number threshold, quality threshold, etc.) of high quality correspondence vectors, a threshold number of null value correspondence vectors, a threshold (e.g., number, quality threshold) of low quality correspondence vectors, a predetermined amount of time (e.g., the method and/or steps thereof are iterated until a predetermined amount of time has elapsed), an improvement metric (e.g., over a prior correspondence map, over a prior correspondence vector, etc.) falling below a threshold value, an image quality score (e.g., determined based on the individual quality scores or pixel representation of the image's constituent pixels) exceeding a threshold value, and/or any suitable stop condition.

The method and/or steps thereof are preferably performed for each (analysis) pixel in parallel with the other pixels of the image (e.g., N instances of S400 are performed in parallel for N analysis pixels). In an illustrative example, S400 and S500 can be concurrently iteratively performed for each pixel in the analysis image. However, the method and/or steps thereof can be performed in series for each analysis pixel (e.g., S400 is performed for a first analysis pixel, then performed for a second analysis pixel); be batched (e.g., by sub-step such as candidate correspondence vectors for all pixels can be determined as a batch, then evaluated as a batch); or be otherwise computationally and temporally organized.

When the method or a step thereof references a nonexistent pixel (e.g., the analysis pixel is on an edge of the image and the hashing walk indicates a pixel location off the edge of the image, a location off a boundary of the image, a correspondence vector that points to a location outside of the corresponding image, etc.), the values of a different pixel can be used instead (e.g., the analysis pixel values, the values of the nearest pixel to the nonexistent pixel, etc.), the image can be duplicated (e.g., along the horizontal direction, along the vertical direction), the nonexistent pixel can include a special designation (e.g., an empty space, not-a-number (NaN), null set, etc.), the values of adjacent pixels can be interpolated or extrapolated to synthesize the nonexistent pixel's values, and/or nonexistent pixels can be otherwise treated.

In examples, the method can apply methods disclosed in U.S. application Ser. No. 16/936,269 filed 22 Jul. 2020 entitled "PASSIVE STEREO DEPTH SENSING," incorporated herein in its entirety by this reference, across sequential frames instead of or in addition to concurrently sampled images.

Receiving images S100 preferably functions to acquire at least two images (e.g., first and second image) for analysis. The images can be preprocessed (e.g., according to S200), unprocessed, or otherwise processed. The images can be received before or after a pixel representation is determined for the images.

The images can be: stereo images, concurrently captured images (e.g., of the same scene), asynchronously captured images, consecutive frames from a video, non-consecutive frames from a video, subsequent frames from a series of image frames, consecutive images from the same camera, and/or other images.

The images can be received at the same or different time. In one example, the images are stereoimages received at the same time. In a second example, the images are serial frames from a common camera, and received at different times. In the second example, the first frame can already be preprocessed, have a (stored) pixel representation, have an associated correspondence map (e.g., generated from comparison with a preceding frame) or be otherwise processed. Alternatively, the first frame's information (e.g., pixel representations, correspondence map, etc.) can be ignored, deleted, or not used in the subsequent analysis.

The images can be: sampled by the image acquisition system, received (e.g., from an image acquisition system, at a computing system, etc.), retrieved (e.g., from an image database), simulated, and/or otherwise obtained.

In variants of the method including preprocessing the images S200, preprocessing the images can function to modify (e.g., translate, rotate, etc.) one or more images to ensure that the images are co-planar and aligned to have parallel epipolar lines, generate a rectified image set (e.g., rectified image pair), modify one or more images (e.g., remove bad pixels, remove blur, change brightness and/or contrast, etc.) and/or perform any suitable function. Preprocessing the images preferably occurs prior to determining the image hash; however, preprocessing the images can occur at the same time as and/or after determining the image hash. Preprocessing the images is preferably performed by a processing module (e.g., pre-processing module, post-processing module, etc.); however, any suitable component can be used to preprocess the images. Preprocessing the images can include rectifying the image, scaling at least one of the images (e.g., scaling the pixel size, scaling the full image, to match another image size, etc.), converting the images (e.g., from color images to greyscale, compress the image file, interpolating between pixels of the image(s) etc.), and/or can include any suitable steps. In a specific example, rectifying the images can include rectifying the images using the Hartley method, which can include the steps of determining sparse feature correspondences, estimating a fundamental matrix, and computing projective transformations to map the epipoles of the image pair to infinity. In this specific example, rectifying the images can generate new values for the effective focal length of the image acquisition system and the effective distance between the centers of projection. However, rectifying the images can be performed in any suitable manner.

Determining a pixel representation S300 functions to generate an encoding for a pixel. The pixel representation is preferably representative of (e.g., encodes) the local surface surrounding the pixel (e.g., portions of the scene depicted by a pixel patch adjacent the pixel), but can alternatively encode the pixel itself, or any other suitable information.

S300 is preferably performed for pixels of all images received in S100, but can alternatively be performed for all pixels of a subset of the images, a subset of pixels from each image, or any other suitable set of pixels. S300 is preferably performed once for each pixel, but can alternatively be performed multiple times per pixel (e.g., using the same or different encoding methods).

The pixel representations for the pixels within an image can be: determined once and stored, determined on the fly (e.g., whenever the pixel is analyzed), or determined at any other suitable time. The pixel representation is preferably determined before S400 and/or S500, but can alternatively be determined between S400 and S500, be determined after S200, and/or determined at any other suitable time.

S300 preferably includes: determining a hashing walk (e.g., patch traversal pattern) and determining the pixel representation for each pixel using the patch traversal pattern. However, the pixel representation can be otherwise performed.

Determining the hashing walk functions to determine a series of neighboring pixels within the same image (e.g., set of hashing pixels) to use for pixel representation determination.

The hashing walk preferably defines an ordered path (e.g., series of pixels) within a pixel patch, wherein the pixel patch has a predefined arrangement relative to the analysis pixel (e.g., is centered on the analysis pixel, is offset from the analysis pixel by a predetermined number of pixels, etc.), but can alternatively determine an unordered set of pixels to compare the analysis pixel against, or be otherwise configured. The hashing walk is preferably an ordered path that specifies an order for traversing a set of hashing pixels (e.g., the neighboring pixels) within a pixel patch (e.g., hashing block of pixels). However, the hashing walk can specify any other suitable information. The hashing walk is preferably the same for each pixel (e.g., in the image, in an image set, between the compared images, for an operation session, etc.), but can alternatively be different.

The set of hashing pixels is preferably distinct for each pixel; however, the set of hashing pixels can be the same for a subset of pixels, and/or any suitable pixels can be used. The set of hashing pixels preferably comprises a multiple of 2 (e.g., 2, 4, 8, 12, 16, 32, 64, 128, etc.) pixels; however, any suitable number of pixels can be included in the set of hashing pixels. The pixels in the set of hashing pixels are preferably distinct (e.g., the same pixel is not included twice); however, set of hashing pixels can include one or more repeating pixels.

The pixel patch is preferably representative of the local surface adjacent the scene region depicted by the pixel, but can be representative of the entire image, entire scene, or be otherwise defined. The set of hashing pixels preferably correspond to (e.g., are selected from) the pixel patch; however, additionally and/or alternatively, the set of hashing pixels can be selected from the (whole) analysis image, and/or from any suitable pixels. The pixel patch is preferably a set of pixels that are near the analysis pixel (e.g., separated from the analysis pixel by less than a threshold number of pixels; be within a predetermined pixel region relative to the analysis pixel, etc.); however, the pixel patch can correspond to any suitable region of the analysis image. The analysis pixel can be centered within the pixel patch, the analysis pixel can be off-center of the pixel patch, the analysis pixel can be along an edge of the pixel patch, the analysis pixel can be outside of the pixel patch, and/or each analysis pixel can have any suitable orientation relative to the pixel patch. The pixel patch is preferably a two dimensional pixel patch (e.g., contains pixels along both a vertical extent and a horizontal extent); however, the pixel patch can be one-dimensional (e.g., contain pixels only along a horizontal extent, contain pixels only along a vertical extent, etc.), and/or the pixel patch can have any suitable dimensions. The pixel patch can be square (e.g., have the same number of pixels in the vertical and horizontal directions, cover the same range along the vertical and horizontal directions, etc.), rectangular (e.g., have a different number of pixels in the vertical and horizontal directions, cover a different range along the vertical and horizontal directions, etc.), have an arbitrary shape, and/or have any suitable shape. The pixel patch preferably includes more pixels than the number of pixels in the set of hashing pixels (e.g., 2, 4, 8, 10, 20, 100, etc. times more pixels in the pixel patch than in the set of hashing pixels); however, the pixel patch can have the same number of pixels as the number of hashing pixels.

The hashing walk preferably samples a predetermined proportion of the pixel patch (e.g., sufficient or insufficient to create a unique encoding for the pixel within the image), but can sample a predetermined proportion of the scene or be otherwise defined.

The same hashing walk is preferably used for each pixel of all images, but different hashing walks can be used for different pixels of the same image (e.g., a different hashing walk can be defined for pixels within a predetermined distance of an edge of the image), different images (e.g., from the same or different operation session), and/or other pixels of other images. The hashing walk preferably begins at the analysis pixel and traverses each hashing pixel, but can start and/or traverse any suitable pixel(s). The hashing walk is preferably a set of hashing 2-tuples that describes the directions to the next pixel in the set of hashing pixels (e.g., how many pixels up/down and left/right to reach the next pixel in the deterministic map); however, additionally or alternatively, the hashing walk can be a set of pixel indices, a set of pixel numbers, a set of hashing 1-tuples (e.g., where the set of hashing pixels are arranged along a horizontal or vertical direction), and/or have any suitable format. The hashing walk is preferably retrieved from storage, but the hashing walk can be generated (e.g., for each instance of the method, for each instance of S300, for each pixel, etc.) and/or determined in any manner.

Figure 3:
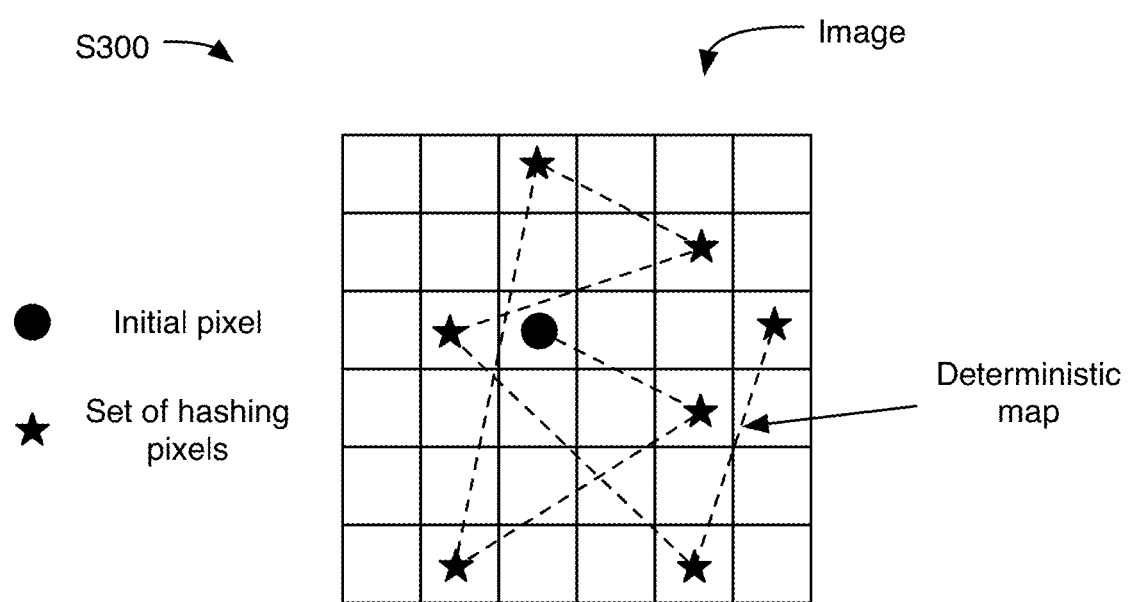
FIG. 3 is a schematic representation of an example of determining bit strings corresponding to a pixel.

The hashing walk is preferably determined using a deterministic method (e.g., sampled using a low discrepancy sequence, determined according to a set of rules or heuristics, etc.), but can be determined using a nondeterministic method (e.g., semi-random sampling, random sampling, etc.). Examples of deterministic methods that can be used can include Halton sequences, Sobol sequence, Kronecker sequence, Niederreiter sequence, $R_2$ sequence, Hamersley set, Poisson disk sampling, Van der Corput sequence, as shown for example in FIG. 3, and/or any deterministic sequence.

The pixel representation corresponding to an analysis pixel is preferably generated by comparing pixel parameters for each hashing pixel in the hashing walk to the preceding hashing pixel of the hashing walk (e.g., comparing pixel parameters of sequential pixels in the hashing walk). However, the pixel representation can additionally or alternatively be generated by comparing pixel parameters of the analysis pixel and each hashing pixel specified by the hashing walk, assigning the pixel parameter value as the pixel representation, or be otherwise determined. The pixel parameter is preferably an intensity (e.g., grayscale intensity, intensity within a color channel, overall intensity), but can alternatively be the any other suitable pixel parameter (e.g., such as those discussed above).

Comparing the pixel parameters preferably includes computing the difference between the pixel parameter values, wherein the pixel representation is updated based on the difference; however, comparing the pixel parameters can include determining a similarity between the pixel parameter values, summing the pixel parameter values, and/or otherwise comparing the pixel parameters. Updating the pixel representation based on the difference can include: concatenating the sign of the difference (e.g., where + is 1 and − is 0) to the pixel representation; concatenating the value of the difference to the pixel representation; adding the difference to the pixel representation; and/or otherwise updating the pixel representation based on the difference.

In an illustrative example, the pixel representation for an analysis pixel can be generated by traversing a set of hashing pixels proximal the analysis pixel in an order determined based on the hashing walk; for each hashing pixel in the sequence, comparing the intensity of the hashing pixel to the intensity of the preceding hashing pixel (or subsequent hashing pixel) in the hashing walk, and appending a value determined from the comparison to the pixel representation. This process can be repeated until every pixel in the set of hashing pixels has been compared. The value can be a binary value (e.g., 1 if the current pixel's parameter value is higher than the comparison pixel's parameter value; 0 if the current pixel's parameter value is lower than the comparison pixel's parameter value), integer value or float value (e.g., the difference in the pixel parameter values), or otherwise defined.

In a first specific example, the pixel representation can include a bit string (e.g., a binary hash) where each wherein each bit is generated based on the intensity comparison between the hashing pixel and the preceding pixel of the hashing walk. For instance, when the intensity of the hashing pixel is greater than the intensity of the preceding hashing pixel, a '1' can be assigned to the bit string and when the intensity of the hashing pixel is less than to the intensity of the preceding hashing pixel, a '0' can be assigned to the first value of the bit string. However, additionally or alternatively, a '0' can be assigned when the intensity of the hashing pixel is greater than the intensity of the preceding hashing pixel and a '1' can be assigned when the intensity of the hashing pixel is less than the intensity of the preceding hashing pixel, a '0' or a '1' can be assigned when the intensity of the hashing pixel and preceding hashing pixel are the same, and/or any suitable value can be assigned.

In a second specific example, the pixel representation can be represented as an integer or floating point (e.g., instead of a binary value; such as an integer-valued hash, nonbinary hash, enhanced pixel hash, enhanced pixel representation, etc.), where the pixel representation can store a difference in the intensity between the hashing pixel and the preceding pixel of the hashing walk. Each intensity can be added together, appended to the pixel representation, and/or otherwise be combined to form the pixel representation. However, the pixel representation can be determined in any suitable manner.

Determining a correspondence map functions to generate a map that identifies matching pixels across images, wherein the matched pixels depict the same points in the common scene. The correspondence map is preferably determined by comparing the pixel representations (e.g., determined in S300) of proposed matches (e.g., candidate correspondence vectors), but can be determined by comparing pixel parameters or other information representative of the scene region depicted by the pixels. The correspondence map can be integer-accurate (e.g., have pixels mapped to other pixels in the opposing image), be sub-pixel accurate (e.g., have pixels mapped to inter-pixel points in the opposing image), or have any other suitable accuracy.

The correspondence map is preferably determined by the computing system, but can alternatively be determined by a processing system or other system.

A correspondence map is preferably determined for each image, but can alternatively be determined for a subset of images. A correspondence map for each image is preferably determined in real time, upon receipt in S100, but can alternatively be determined asynchronously with receipt or at any suitable time. The correspondence map for an image is preferably determined after S300 for the image, but can alternatively include S300, be performed before, or be otherwise performed.

Determining the correspondence map can include: determining a set of correspondence vectors S400 and determining a cost for each correspondence vector S500. These substeps can be performed one or more times to iteratively refine the correspondence map.

Figure 8:
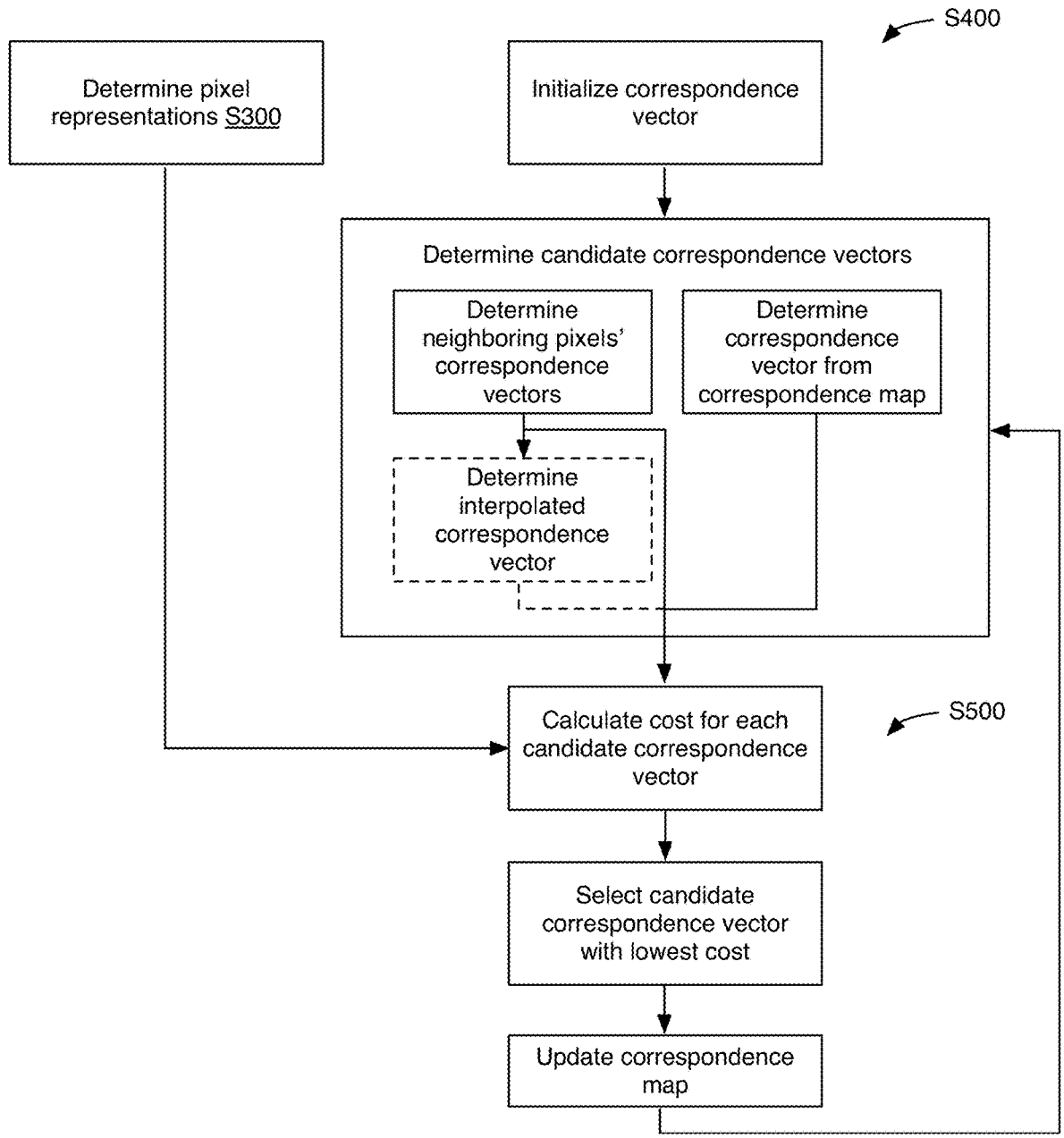
FIG. 8 is a schematic representation of an example of determining a correspondence map.

As shown for example in FIG. 8, an instance of determining the correspondence map for an image can include, for each pixel of an image: determining an initial correspondence vector (e.g., using S400, based on a prior correspondence map, using an initialization method, etc.); iteratively determining a set of candidate correspondence vectors (e.g., using S400), evaluating the match proposed by each correspondence vector (e.g., using S500, by calculating a cost value associated with each correspondence vector, and updating the correspondence map based on the evaluation until a stop condition is met. The updated correspondence vectors can be iteratively generated a predetermined number of times, until an iteration criterion is met, until a predetermined correspondence map quality is achieved, and/or until any suitable stop condition is met. However, the correspondence map can be otherwise determined.

Determining the set of correspondence vectors S400 functions to determine one or more correspondence vectors associated with a set of analysis pixels, where each correspondence vector maps the analysis pixel (e.g., of the analysis image) to a corresponding pixel (e.g., of the corresponding image). S400 preferably occurs after S300, but can be performed before and/or during S300. S400 is preferably performed by a correspondence vector module, but can be performed by a processing module, a computing system, and/or any suitable system.

The set of correspondence vectors can be associated with: a single pixel (e.g., analysis pixel), the entire image (e.g., cooperatively form a correspondence map), or be associated with any other suitable data structure.

S400 is preferably iteratively performed with S500 (e.g., for each instance of S400, an instance of S500 is performed), but S400 and S500 can be performed independent of one another or with any suitable timing.

In an illustrative example, a single instance of S400 and a single instance off S500 can be performed for each pixel (e.g., of an analysis image) during each iteration; however, multiple instances of S400 can alternatively be performed for each pixel during each iteration. In variants, pausing the tests for each pixel (e.g., by limiting the number of instances per pixel per iteration to the single set of candidate correspondence vectors per iteration) can function to control information propagation (e.g., correspondence vector updating) across the image, which can decrease the total amount of computational resources required to generate the final correspondence map.

Alternatively, S400 can be performed for a subset of pixels in the analysis image during each iteration. In one example, S400 can be performed for the subset of the pixels with correspondence vectors with correspondence vector qualities less than a correspondence vector quality threshold. In a second example, S400 can be performed for a random set of pixels for each iteration. However, S400 can be performed for any suitable set or subset of pixels in the image.

S400 is preferably performed for each pixel within an image in parallel (e.g., during the same iteration), but can alternatively be performed for each pixel in series.

The set of correspondence vectors can include: a set of initialization vectors, a set of candidate correspondence vectors, and/or any other suitable correspondence vector.

S400 can include determining an initial correspondence vector, which functions to assign (e.g., generate) a correspondence vector (e.g., an initial correspondence vector) to pixels (e.g., analysis pixels) of the analysis image. The initial correspondence vector is preferably determined once for each pixel per correspondence map determination instance, but can alternatively be determined multiple times. The initial correspondence map (e.g., the set of initial correspondence vectors for each pixel within the analysis image) can be the same and/or different for each of the images. In an illustrative example, different implementations of the method can use the same initial correspondence map. In a second illustrative example, different implementations of S400 (for example different frames processed by the method) can use different initial correspondence maps. However, any suitable initial correspondence map can be used.

In a first variation, initial correspondence vectors are determined using an initialization method. This variation can be used when no prior correspondence map is available; to fill gaps in the prior correspondence map; used for every initialization; used when an initialization condition is met (e.g., a confidence or accuracy of the prior correspondence map falls below a threshold); or used at any other suitable time.

The initialization method can be deterministic (e.g., use a low discrepancy sequence, a set of rules, etc.); non-deterministic (e.g., random, pseudo-random, etc.), and/or can be determined in any suitable manner. In particular, the initialization pattern can be deterministic, and the initialization vectors can be deterministically determined; however, other portions of the initialization method can be non-deterministic.

The initialization method can include: determining a set of initialization vectors, determining an initialization pattern, and assigning initialization vectors according to the initialization pattern. However, any other suitable initialization method can be used.

The set of initialization vectors are preferably deterministic, but can alternatively be non-deterministic. In an example, each of the initial correspondence vectors is generated according to a Halton sequence; however, the initial correspondence vectors can be generated using any suitable low discrepancy sequence, be randomly assigned, and/or otherwise determined. A single initialization vector is preferably generated for each pixel, but multiple initialization vectors can alternatively be generated (e.g., wherein one or more vectors are selected from the set). The initialization vectors can be: predetermined (e.g., before initialization pattern traversal), determined after initialization pattern traversal, determined during initialization pattern traversal (e.g., on the fly), or determined at any other suitable time.

Figure 7A:
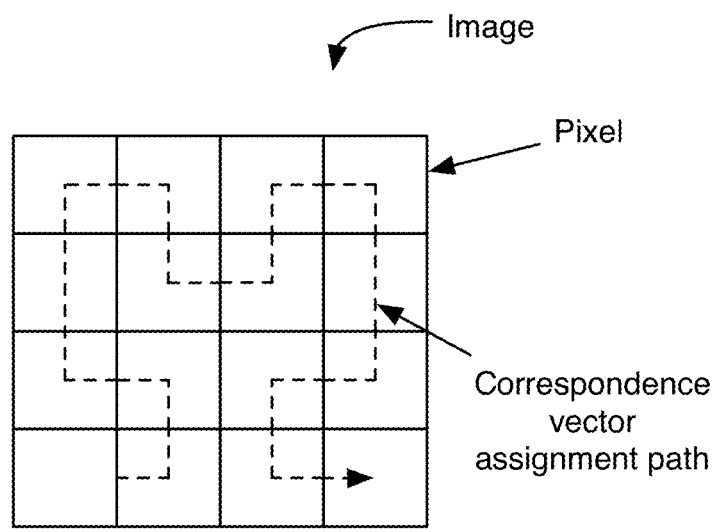
FIGS. 7A and 7B are schematic representations of examples of correspondence vector assignment paths travelling through the pixels of an image and assigning a correspondence vector to each pixel as it is passed.
Figure 7B:
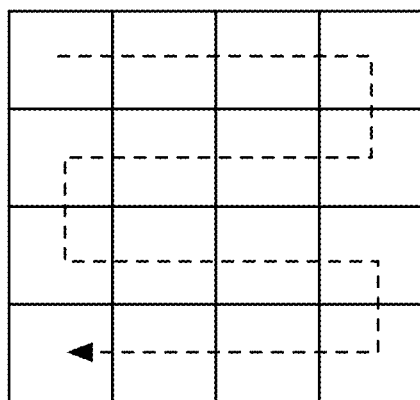

The initialization pattern specifies which pixel is assigned an initialization vector, and can optionally specify the order in which the pixel is assigned the initialization vector. The initialization pattern is preferably a pixel assignment order specified by a correspondence vector assignment path (e.g., optic flow assignment path). The correspondence vector assignment path is preferably a space filling curve; however, a space filling tree, and/or any suitable path can be used. The space filing curve is preferably large enough to fill the image plane or portion thereof, but can be otherwise sized. The correspondence vector assignment path can be a Hilbert curve (e.g., example shown in FIG. 7A), an onion curve, Morton curve, Moore curve, Peano curve, Gosper curve, and/or any other space filling curve. However, the correspondence vector assignment path can be boustrophedonic (example shown in FIG. 7B), a raster pattern (e.g., increasing along rows, increasing along columns, etc.), random, and/or have any other suitable pattern. However, any suitable correspondence vector assignment path can be used.

In a second variation, the initial correspondence map or initial correspondence vector for a given pixel is determined from a prior correspondence map. The prior correspondence map is preferably from the prior timestep immediately preceding the current timestep, but can alternatively be from several timesteps prior. The prior correspondence map is preferably for an image from the same image acquisition system, more preferably from the same camera, but can alternatively be from a different camera (e.g., an adjacent camera), a different system, and/or be any other suitable correspondence map.

The previous correspondence map (e.g., final correspondence map, validated correspondence map, etc.) is preferably used as the initial correspondence map; alternatively, new correspondence vectors can be calculated from the corresponding pixel's prior correspondence vector (e.g., based on odometry, interim egomotion movement, etc.), correspondence vectors can be selectively populated to the initial correspondence map, any suitable subset of the previous correspondence map can be propagated (e.g., the set of correspondence vectors from the previous correspondence map that are not nullified; the set of correspondence vectors that meet an initial correspondence vector criterion such as based on the quality of the previous correspondence vector; etc.), or the prior correspondence map can be otherwise used. This can be particularly useful for optical flow and/or feature tracking in live video, where the previous correspondence map from a prior frame (e.g., immediately prior frame, n frames prior, etc.) can be used as the initial correspondence map for the current frame (for the same camera). In a specific example, the initial correspondence map can include the set of correspondence vectors that do not have a null value from the previous correspondence map (e.g., the validated correspondence map). In this specific example, each pixel corresponding to a correspondence vector that has a null value in the previous correspondence map can be initialized to a correspondence vector: based on adjacent pixels (e.g., assigned a value based on an adjacent pixel, interpolated correspondence vector between adjacent pixels, etc.), randomly, pseudo-randomly, deterministically, according to a propagation algorithm (e.g., jump flood algorithm, checkerboard propagation, etc.), according to an initialization method (e.g., as described above), and/or to any suitable value. However, the initial correspondence map can include any suitable correspondence vectors.

S400 can include determining a set of candidate correspondence vectors, which functions to select, determine, and/or identify a set of candidate correspondence vectors to evaluate (e.g., to try to find a higher quality correspondence vector for each pixel). Candidate correspondence vectors can be determined, for each pixel: each correspondence map determination iteration, determined once for each correspondence map determination instance, and/or determined at any other suitable frequency. The set of candidate correspondence vectors is preferably determined for a given pixel, but can alternatively be determined for an image segment or entire image. One or more candidate correspondence vectors are preferably determined for each pixel.

The candidate correspondence vectors can include: one or more correspondence vectors from a prior iteration of the correspondence map (e.g., an initial correspondence vector, previous correspondence vector), random correspondence vectors, correspondence vectors generated using a low discrepancy sequence, correspondence vectors determined based on pixels proximal the analysis pixel (e.g., neighboring pixels, pixels within a predetermined pixel distance of the analysis pixel, etc.), interpolated correspondence vectors (e.g., determined from the pixels neighboring the analysis pixel), assigned according to a set of rules; or otherwise determined.

The set of candidate correspondence vectors preferably includes the previous correspondence vector (e.g., from the previous iteration, the initial correspondence vector), but can alternatively exclude the previous correspondence vector. In variants, the set of candidate correspondence vectors can be compared to the set of candidate correspondence vectors from a prior iteration, and shared candidate correspondence vectors can be excluded from consideration for the current iteration. However, the set of candidate correspondence vectors can include any suitable correspondence vector(s).

The candidate correspondence vectors preferably include at least one candidate correspondence vector determined based on the correspondence vectors of pixels adjacent to, proximal to, and/or neighboring the analysis pixel. The neighboring pixels are preferably located within a predetermined distance (e.g., number of pixels) of the analysis pixel, but the neighboring pixels can be any suitable pixels. The neighboring pixels can be along the same horizontal line as the analysis pixel, the same vertical line as the analysis pixel, diagonal to the analysis pixel, and/or have any orientation relative to the analysis pixel. The neighboring pixels are preferably symmetrically arranged relative to the analysis pixel (e.g., an equal number of pixels to the left and right of the analysis pixel, an equal number of pixels above and below the analysis pixel, etc.), but the neighboring pixels can be asymmetrically arranged relative to the analysis pixel.

The neighboring pixels for each iteration can be selected using a low-discrepancy sequence, a set of rules, random sampling, or otherwise selected.

The neighboring pixel's predetermined distance can depend on the image resolution, a predetermined distance, a target quality, an application, an iteration number, a total number of iterations, and/or be otherwise determined. In specific examples, the maximum predetermined distance is preferably less than about 20 pixels. However, the maximum predetermined distance can be greater than 20 pixels. For each iteration, a predetermined distance is preferably determined where the predetermined distance is less than or equal to the maximum predetermined distance. The predetermined distance is preferably selected according to a low discrepancy sequence but can be selected randomly, according to a rule, responsive to a cost value (e.g., associated with the previous correspondence vector), and/or otherwise be selected. However, the same predetermined distance can be used for each iteration, for a given analysis image, and/or any predetermined distance can be used. In variants, the maximum predetermined distance can decrease as the iteration number increases. In an illustrative example, for a first iteration, the maximum predetermined distance can be 20 pixels, for a second iteration, the maximum predetermined distance can be 10 pixels, for a third iteration, the maximum predetermined distance can be 5 pixels, and so on. However, the maximum predetermined distance can be constant and/or be selected in any manner.

In variants, a different predetermined distance can be selected or used along a horizontal and vertical direction. However, the same predetermined distance can be used along the horizontal and vertical directions.

The candidate correspondence vectors can be: the correspondence vector for neighboring pixels (e.g., the correspondence vector for the pixel above, below, to the right, to the left of the analysis pixel, etc.; the $1^{st}$, $2^{nd}$, $3^{rd}$, $5^{th}$, $10^{th}$, $20^{th}$, etc. nearest neighbor(s)); determined by interpolating between neighboring pixels (e.g., the mean of the correspondence vectors above and below the analysis pixel, the mean of the correspondence vector to the right and to the left of the analysis pixel, etc.; $1^{st}$, $2^{nd}$, $3^{rd}$, $5^{th}$, $10^{th}$, $20^{th}$, etc. nearest neighbors; the mean of symmetrical nearest neighbors; median of any of the above; weighted average of the above; etc.); or be otherwise determined. In an illustrative example, a candidate correspondence vector can be determined by averaging the prior correspondence vector for two neighboring pixels of the analysis pixel. In this illustrative example, the neighboring pixels are preferably, but not necessarily, arranged symmetrically about the analysis pixel.

Additionally, or alternatively, a candidate correspondence vector can be determined randomly, quasi-randomly, deterministically, according to a propagation algorithm (e.g., jump flood algorithm, checkerboard propagation, etc.) and/or in any suitable manner.

The number of candidate correspondence vectors can be selected (and/or tuned) based on an application, a number of iterations, a target quality of the correspondence map, a predetermined number, quasi-randomly (e.g., a quasi-random number of candidate correspondence vectors can be selected), randomly, and/or any suitable number. In an illustrative example, the set of candidate correspondence vectors can include 7 candidate correspondence vectors corresponding to the previous correspondence vector, the correspondence vector for a neighboring pixel along each direction, and a mean correspondence vector along a horizontal direction and a vertical direction. However, the number of candidate correspondence vectors can be any value or range thereof between about 1 and 100 such as 1, 2, 3, 4, 5, 6, 7, 8, 9, 10, 15, 20, 25, 30, 50, less than 1 (e.g., no candidate correspondence vectors can be generated for one or more analysis pixel), or greater than 100 candidates correspondence vectors.

S400 can include determining a sub-pixel correspondence vector. In a first variation, the sub-pixel correspondence vector can be determined by minimizing a cost function C (e.g., as discussed below). In a second variation, the sub-pixel correspondence vector can be determined by dividing the distance between pixels neighboring the corresponding pixel into predetermined increments, wherein each increment is treated as a new correspondence vector candidate for the analysis pixel. In this variation, a pixel representation can be calculated for every predetermined increment (e.g., by interpolating between the pixel representation values of the neighboring pixels; by interpolating the pixel parameter value between the neighboring pixels and calculating a pixel representation from the interpolated pixel parameter values, etc.), the analysis pixel representation can be compared against each increment's pixel representation (e.g., in S500), and the increment with the lowest cost can be selected as the new correspondence vector. Alternatively, the corresponding vector can be determined using heuristics (e.g., quadratic interpolation) and/or any other suitable method.

Determining a cost for each correspondence vector S500 preferably functions to determine whether the corresponding pixel in the opposing image, identified by the correspondence vector, is a good match with the analysis pixel. This is determined by comparing the analysis pixel (e.g., from the analysis image) to corresponding pixel(s) in the corresponding image (e.g., wherein the corresponding pixels in the second image are specified by the correspondence vector). Evaluating the correspondences is preferably performed by a computing system (e.g., a cost module or sub-cost module of a computing system); however, any suitable system and/or component can be used. S500 is preferably performed for all pixels within an image in parallel, but can additionally or alternatively be compared in series. S500 is preferably performed for all candidate correspondence vectors for a given pixel in parallel, but can alternatively be performed in series.

The pixel representation for the analysis pixel is preferably compared to the pixel representation for each corresponding pixel identified by the respective correspondence vector. However, additionally or alternatively, one or more pixel parameters (e.g., intensity, RGB intensity, intensity of one or more adjacent pixels, etc.) or pixel metrics can be compared and/or the analysis and corresponding pixels can be compared in any manner. Comparing the analysis pixel and the corresponding pixel preferably includes evaluating a cost function (e.g., a distance function) to determine a cost value, but can additionally or alternatively include using machine learning (e.g., a neural network), calculating a difference between the analysis pixel and corresponding pixel (e.g., the pixel representations of the analysis and corresponding pixel, a pixel parameter, etc.), and/or otherwise comparing the analysis pixel and corresponding pixel (s). Examples of cost values can include string distance metric, Hamming distance, Levenshtein distance, edit distance, Jaro-Winkler distance, a sum of absolute differences, a sum of squared differences, and/or any suitable cost value.

In a first variation of S500, the bit string (e.g., binary hash) corresponding to an analysis pixel (e.g., from an analysis image) can be compared to the bit string corresponding to each corresponding pixel (e.g., each pixel associated with a correspondence vector of the set of correspondence vectors, candidate correspondence vectors, initial correspondence vectors, etc.). In a specific example, comparing the analysis pixel and corresponding pixel includes determining a Hamming distance between the respective bit strings. In this specific example, the cost value (i.e., the Hamming distance in this specific example) can be stored with the candidate correspondence vector. However, any suitable cost and/or score can be used to evaluate the quality of the match.

Figure 11:
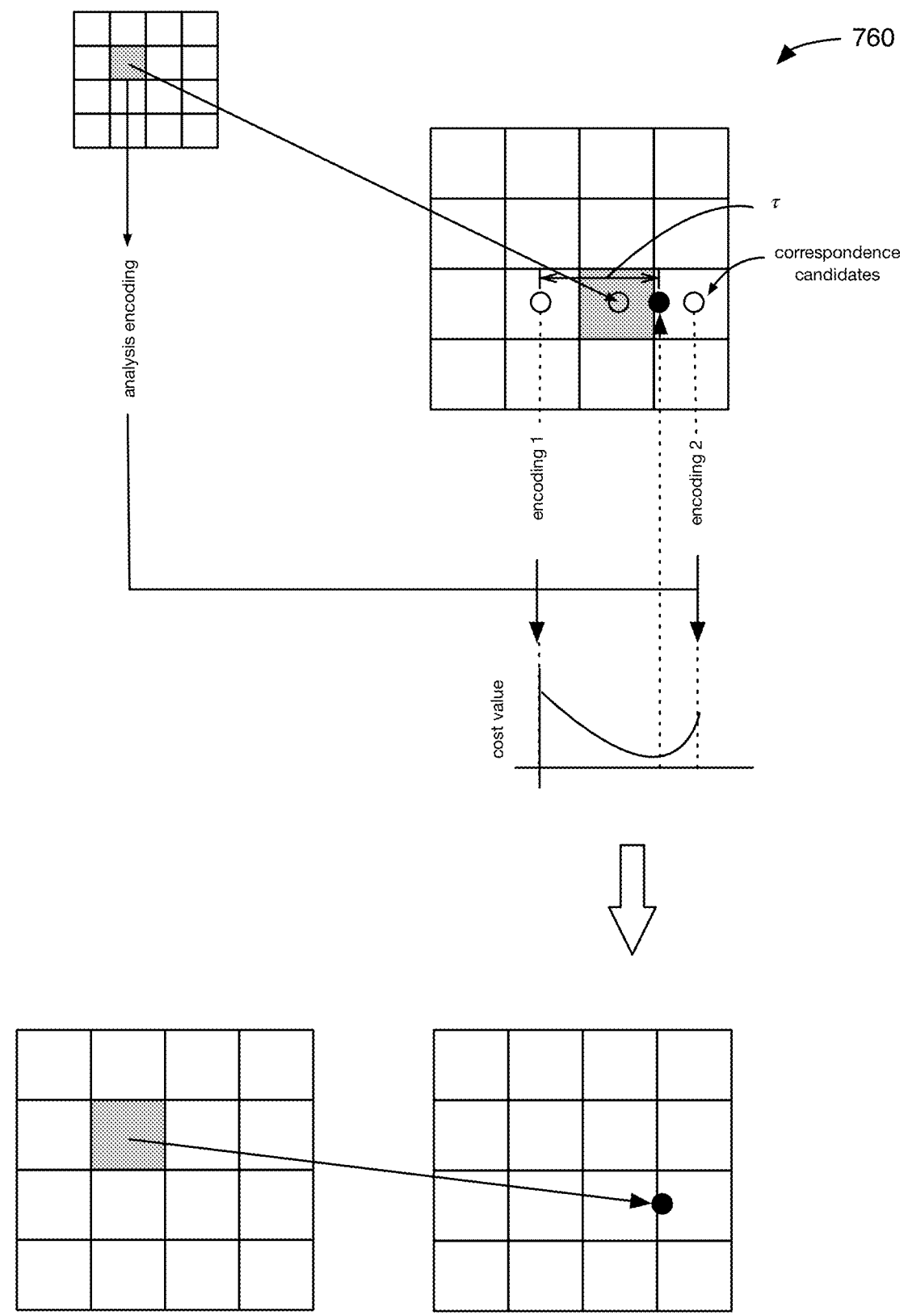
FIG. 11 is an illustrative example of determining a sub-pixel corresponding pixel for an analysis pixel.

In a second embodiment, an integer hash (e.g., non-binary hash) corresponding to an analysis pixel can be compared to an integer hash corresponding to pixels neighboring the corresponding pixel in the corresponding image. The neighboring pixels are preferably the nearest neighbors to the corresponding pixel (e.g., pixels that are immediately adjacent above and below the corresponding pixel, pixels that are immediately adjacent to the left and right of the corresponding pixel, etc.), but can additionally or alternatively include any neighboring pixel (e.g., within a predetermined distance of the corresponding pixel), the corresponding pixel (e.g., when the corresponding pixel is on the edge of the corresponding image), and/or any suitable pixel(s). In an illustrative example of the second embodiment, as shown in FIG. 11, the cost function can be a sum of squared differences between the integer hash of the analysis pixel and a (linear) parameterization of the integer hash for the neighboring pixels such as: $C(\tau)=\Sigma_i(\delta_{a,i}-((1-\tau)\delta_{1c,i}+\tau\delta_{2c,i})^2$, where C is the cost value, $\delta_{a,1}$ is the $i^{th}$ component of the integer hash associated with the analysis pixel, is a parameter, and $\delta_{1c,I}$ and $\delta_{2c,I}$ are the $i^{th}$ component of the integer hash associated with the first and second neighboring pixel to the corresponding pixel respectively. In this illustrative example, the cost value can be evaluated by computing a derivative of the cost function with respect to the parameter, $\tau$, where the cost value can be evaluated at the value of such that $dC/d\tau=0$. However, the cost function and/or cost value can include or be determined using a gradient, interpolation, denoising, machine learning, zero mean cross correlation (ZMCC), a sum of absolute differences, and/or any suitable cost functions or metrics.

In a third embodiment, the first and second embodiments can be used in different steps of the same method. The first embodiment can be used, for example, to evaluate an integer-accurate correspondence map (e.g., correspondence vectors that are accurate to a nearest pixel) and the second embodiment can be used, for instance, to evaluate a subpixel (e.g., floating accuracy) correspondence map (e.g., correspondence vectors that are accurate to a sub pixel assignment). However, the first and second embodiments can be otherwise used and/or combined.

Determining the correspondence map can optionally include updating the correspondence map. The correspondence map is preferably updated with the candidate correspondence vector having the lowest cost value for each pixel (e.g., from a given iteration). When two or more correspondence vectors for an analysis pixel are the same, the correspondence map can include: a correspondence vector with the lowest cost value (e.g., the first one in a sequence, a randomly selected correspondence vector, etc.), an average correspondence vector (e.g., the average of the correspondence vectors with the same cost value), an interpolated correspondence vector (e.g., between the correspondence vectors with the same cost value), and/or any suitable correspondence vector. The correspondence map is preferably used as the previous correspondence map (e.g., in S400, the prior correspondence vector is the correspondence vector in the next iteration). However, the correspondence map can be used in any manner.

In an example, determining a correspondence map for an image includes: initializing the correspondence map with initial correspondence vectors for each pixel; optionally determining an initial cost map based on the initial correspondence vectors; for a fixed number of iterations, for each pixel of the image in parallel: determining a set of candidate correspondence vectors; evaluating each candidate correspondence vector of the set of candidate correspondence vectors by calculating a cost value; updating the correspondence vector with a candidate correspondence vector from the set of candidate correspondence vectors, and optionally updating the cost map with the cost associated with the selected candidate correspondence vector. The process can be repeated for the opposing image (e.g., in parallel, in series). However, the correspondence map can be otherwise updated.

Validating the correspondence map S600 preferably functions to check an accuracy of the correspondence map (e.g., generated in S500). S600 is preferably performed by a computing system (e.g., a cost module of a computing system), but can be performed by any component or system. S600 is preferably performed after correspondence map determination, but can be performed at the same time as correspondence map determination. The correspondence map is preferably validated based on a second correspondence map (for the second image in the same image pair, for a different image pair, such as a prior frame of a video, etc.).

S600 preferably includes repeating S400-S500 to determine the second correspondence map. When repeating S400 and S500, the image roles are preferably reversed (e.g., the analysis image from the first instance is used as the corresponding image for the second instance and the corresponding image from the first instance is used as the analysis image for the second instance of S400 and S500). However, S400 and S500 can be repeated with a different pixel representation, with a different initialization of the correspondence vectors, and/or be otherwise repeated. However, the correspondence map can additionally or alternatively be validated based on satisfaction of validation criteria (e.g., a correspondence map quality threshold, a cost value threshold, etc.), based on model of the correspondence map, using a correspondence map determined using a different method, and/or in any manner.

In a first embodiment, the correspondence map can be validated in response to the correspondences from the first image to the second image matching correspondences from the second image to the first image (e.g., the first and second images are associated with complimentary correspondence maps). When correspondence vectors of the first correspondence map and the second correspondence map are the same (e.g., satisfy a set of validation criteria, such as a threshold number or fraction of pixels in each image with complimentary correspondence vectors, etc.) or within a threshold matching distance (e.g., correspondence vector differs by at most a predetermined number of pixel), then the correspondence map can be validated (e.g., determined to be consistent). When correspondence vectors associated with the first correspondence map and the second correspondence map (and/or one or more correspondence vectors from the correspondence map and the second correspondence map) are not the same (e.g., fail to meet one or more validation criterion); then the method, can include: nullifying the correspondence vectors for the mismatched pixels, nullifying the correspondence maps, determining a third correspondence map (e.g., by repeating S400 and S500), transmitting an error message, store a subset of the correspondence map (e.g., store the segments of the correspondence map that match), can be restarted (e.g., by acquiring new images), and/or can include any suitable steps. However, the correspondence map can be validated in any suitable manner.

In a second embodiment, the correspondence maps can be validated in response to the same correspondence map being calculated across multiple image pairs. However, the correspondence maps can be validated in response to satisfaction of any other suitable validation condition.

Post-processing the correspondence map S700 can function to clean up the correspondence map results (e.g., remove digital artifacts), remove outliers (e.g., with an N×N median filter, such as a 3×3 median filter; bilateral filter; etc.), derive or determine information from the correspondence map, fill gaps in the correspondence map (e.g., processed correspondence map), refine the correspondence map, determine a binoptic flow, and/or perform any suitable function. S700 is preferably performed by a computing system (e.g., a processing module), but can be performed by any component or system.

S700 can include determining a depth map S720 from the correspondence map. The depth map preferably represents a distance between an image acquisition system that acquired the first and/or second image and an object in the first or second image. However, the depth map can be otherwise defined. The depth map is preferably determined based on the correspondence map (e.g., integer-accurate correspondence map, sub-pixel correspondence map, validated correspondence map, etc.). In a first variant of S720, particularly but not exclusively when the first and second images are a stereo image pair, determining a depth map can be performed as disclosed in U.S. application Ser. No. 16/936,269, filed 22 Jul. 2020 entitled "PASSIVE STEREO DEPTH SENSING," herein incorporated in its entirety by this reference.

Figure 13:
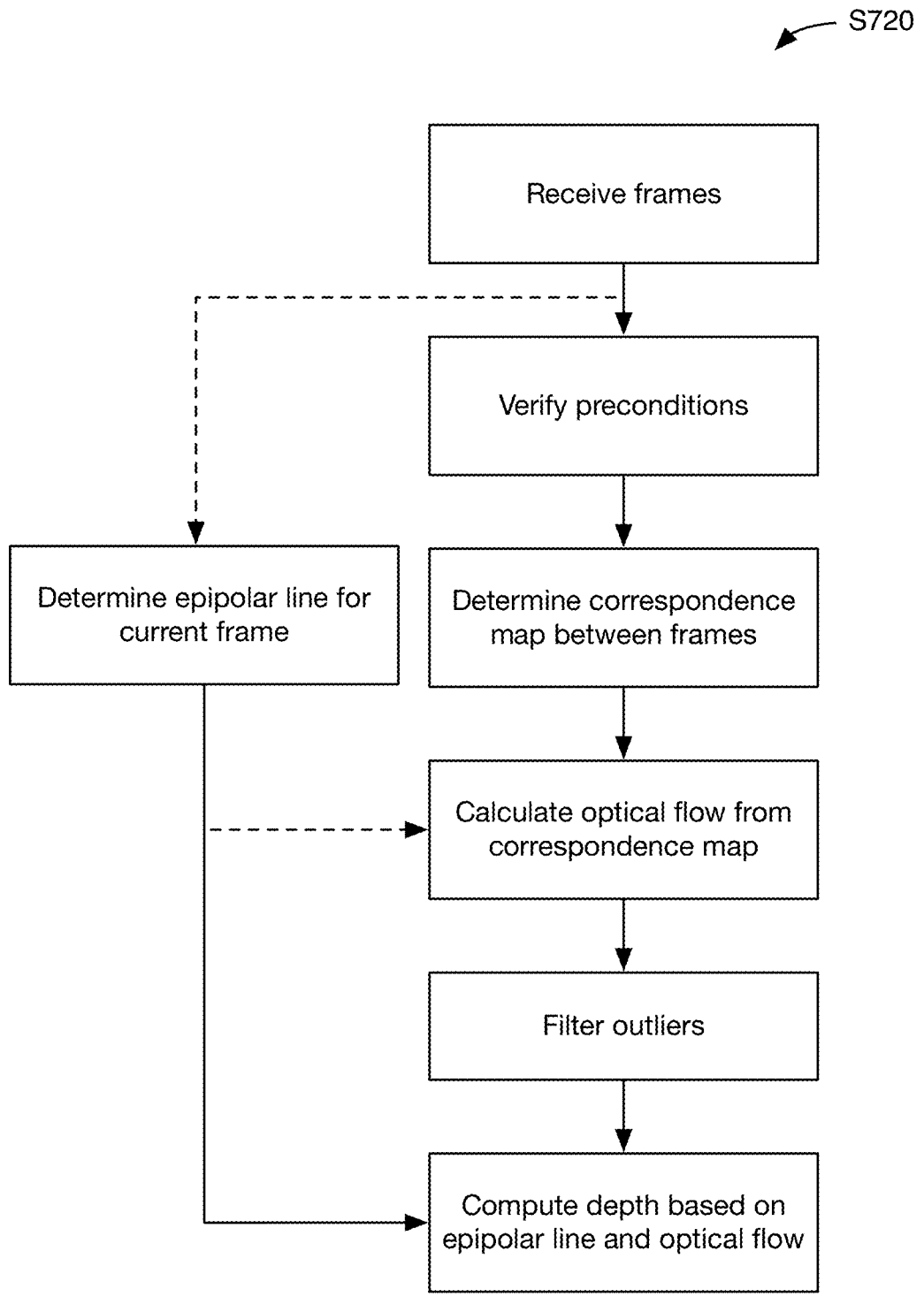
FIG. 13 is an illustrative example of determining a depth map from optic flow.

In a second variant as shown in FIG. 13, particularly but not exclusively when the first and second image are subsequent frames (e.g., of a video), determining a depth map can include: for each analysis pixel and its corresponding pixel: computing an epipolar line, removing rotation from flow (e.g., from the correspondence vector), optionally removing pixels that exceed a distance threshold from the epipole (e.g., epipolar point), and calculating the depth based on the epipolar line (e.g., determined from the epipole and the pixel position) and the flow. The distance threshold can be a minimum distance and/or a maximum distance. In an illustrative example, calculating the depth can include $Z(\vec{u}_t)=z_r(\|\vec{\eta}_t\|-c\|\vec{\varphi}_r\|)/(c\|\vec{\varphi}_r\|)$, where $Z$ is the depth, $u_t$ is the analysis pixel, $\|\ \|$ is the L2 norm, $\vec{\eta}_t$ is the unit vector along the epipolar line, $z_r$ is the distance traveled along the optical axis, $\varphi_r$ is a rotation-compensated flow vector (e.g., $\varphi_r \leftarrow \vec{u}_t - \pi(H\vec{u}_{t-1})$, where H is a rectifying homography), and $c=\cos(\theta)=\vec{\varphi}_r \cdot \vec{\eta}_t/(\|\vec{\varphi}_r\|\|\vec{\eta}_t\|)$.

The second variant is preferably performed when a translation between the analysis image and the corresponding image (e.g., a translation of the image acquisition system between a first and second time frame) exceeds (or is equal to) a translation threshold. The translation threshold can depend on a desired range, a target application, an image acquisition system, an object in the images, and/or otherwise depend on any parameter(s). The translation threshold can be any value between about 1 cm and 10 m, but can be less than 1 cm or greater than 10 m. The translation distance can be determined using an odometry system, inertial sensor, and/or otherwise determined. However, the second variant can be performed when the translation is less than the translation threshold.

The second variant preferably includes determining an epipole position (e.g., after accounting for rotation). When the epipole position exceeds an epipole threshold, the second variant can use stereo images to determine depth (e.g., as described in the first variant), can include an error estimate for the determined depth, can decrease a precision or accuracy of the determined depth, output an error message, and/or include any suitable response. The epipole threshold is preferably a dimensionless quantity relating a motion along the optical axis to a motion orthogonal to the optical axis, but can additionally or alternatively be a dimensional threshold such as a motion along the optical axis, a motion orthogonal to the optical axis, and/or any suitable motion or threshold.

The second variant preferably includes, for each frame (e.g., image), determining a rectifying homography and determining an epipole. In an illustrative example, determining a rectifying homography can include $H=KR^TK^{-1}$, where H is the rectifying homography, K is a projection matrix, and $R^T$ is a rotation matrix. In an illustrative example, determining the epipole can include $\vec{e}=\pi(K\vec{t_R})$, where e is the epipole, π is a projection operator representing conversion from homogeneous to regular coordinates, and $t_R$ is the translation of the object between frame t and t−1 (e.g., determined from the correspondence map).

However, the depth map can be determined in any manner.

S700 can include generating a denser the correspondence map S740, which can function to fill missing correspondence vectors (e.g., gaps) in the correspondence map (e.g., those removed in S600, from outlier removal, etc.). S740 can provide the benefit of completing a depth map for regions of an image that are beyond a predetermined depth (e.g., at infinite depth, such as the sky), substantially featureless (e.g., include less than a threshold number of visually unique features; correspond to the sky, water, etc.), and/or otherwise difficult-to-determine correspondence vectors. S740 preferably fills gaps in a processed correspondence map (e.g., a depth map), but can fill gaps in any correspondence map. S740 preferably uses a neural network (e.g., a deep neural network, a convolutional neural network, a nonlocal neural network, a recursive neural network, etc.) to complete the correspondence map. However, S740 can additionally or alternatively use a model, user input (e.g., user segmentation), and/or otherwise complete the correspondence map. Inputs to the neural network can include: an input image (e.g., the first image, the second image, as shown for example in FIG. 10, etc.), the correspondence map, the depth map, a disparity map, an optic flow, a previous correspondence map (e.g., for a prior frame, for a prior iteration, etc.), image acquisition system parameters, and/or any suitable inputs. Outputs from the neural network can include: a completed depth map, a completed correspondence map, a correspondence map with fewer gaps than the input correspondence map, an image segmentation (e.g., semantic segmentation, instance based segmentation), and/or any suitable outputs. The neural network can be trained using a 3D representation of a scene (e.g., a prerendered or generated 3D representation, a model of the scene, a previously acquired 3D representation, etc.), using a training dataset, using manually entered data, and/or using any suitable training dataset. In a specific example, an image (e.g., RGB, grayscale) and the correspondence map can be provided to the neural network, wherein the neural network can output a denser correspondence map and optionally output a semantic segmentation (e.g., pixel-aligned with the correspondence map).

Figure 12:
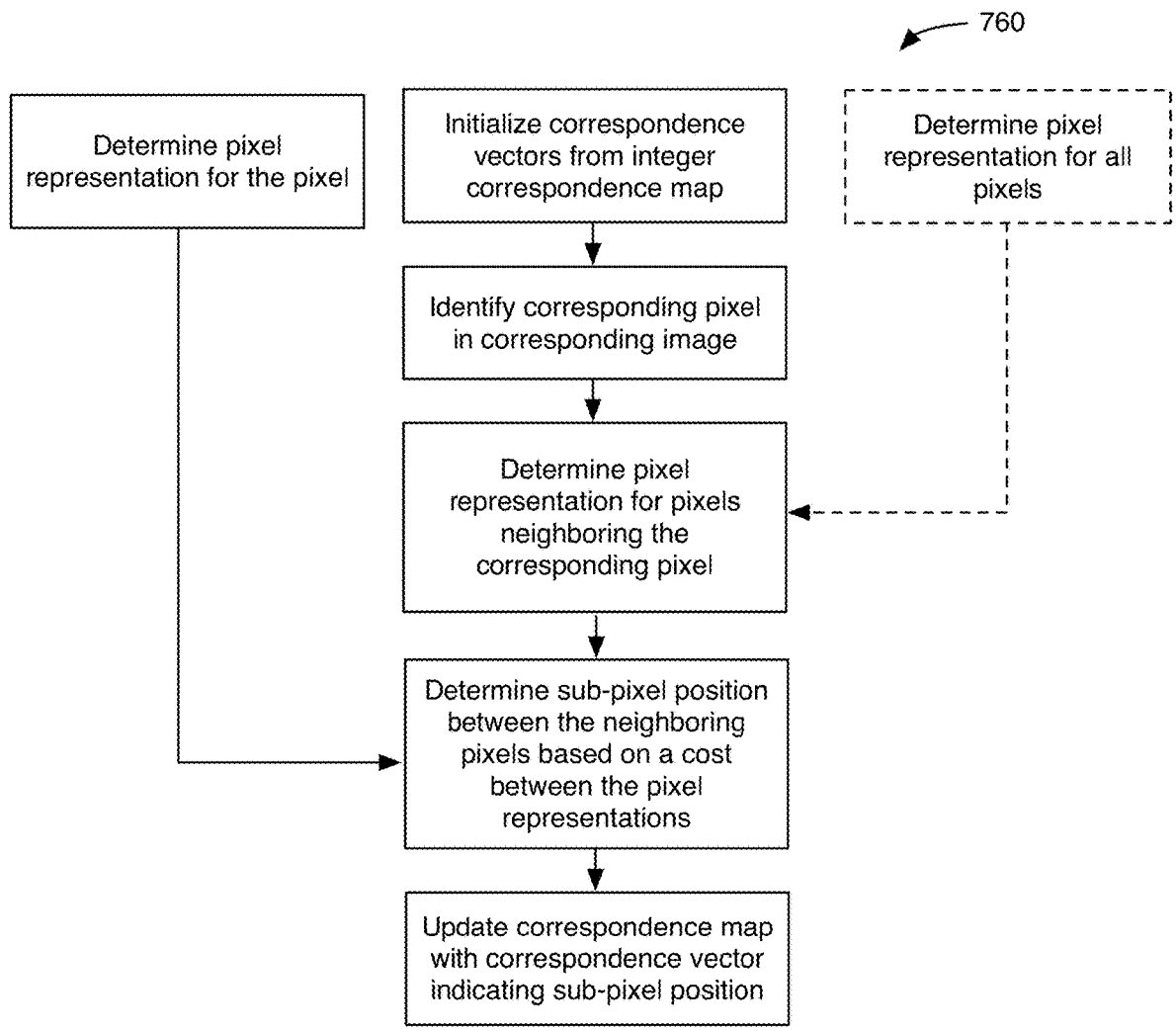
FIG. 12 is a schematic representation of an example of determining a sub-pixel correspondence map

As shown for example in FIG. 12, S700 can include determining a sub-pixel correspondence map S760. S760 can be performed in a manner similar to the method (e.g., performing one or more steps S100-S600) and/or in a different manner.

S760 can include initializing the sub-pixel correspondence map, determining a second pixel representation for pixels of the first and second image (e.g., the same as that used to determine the integer-accurate correspondence map), and comparing the second pixel representations of an analysis pixel and pixels neighboring the corresponding pixel (e.g., as determined from the correspondence vector from the initialized correspondence map).

The sub-pixel correspondence map is preferably initialized based on an integer-accurate correspondence map output by the method and the same images used to determine the integer-accurate correspondence map, but can alternatively be determined based on a sub-pixel correspondence map from a prior timestep, from a prior iteration, and/or from any other suitable correspondence map.

The second pixel representation is preferably an integer hash (e.g., a nonbinary hash, as described in S300), but can be any pixel representation. The second pixel representation is preferably different from the pixel representation used to determine the integer-accurate correspondence map, but the two pixel representations can be the same.

The comparison preferably includes determining a value for a parameter (e.g., as described in S500) between the neighboring pixels, where the value for the parameter is related to the sub-pixel correspondence. In a specific example, the parameter is a distance between the neighboring corresponding pixels and a sub-pixel location, and is determined by minimizing the cost function C (e.g., as discussed above). However, a sub-pixel correspondence can additionally or alternatively be determined by selecting a sub-pixel increment associated with the lowest cost (e.g., of a comparison between the analysis pixel's representation and the sub-pixel's representation), using machine learning (e.g., a neural network such as described in S740), interpolation, denoising (e.g., total variational denoising), heuristics, gradients, and/or any suitable steps or process.

5. Specific Examples

Figure 5A:
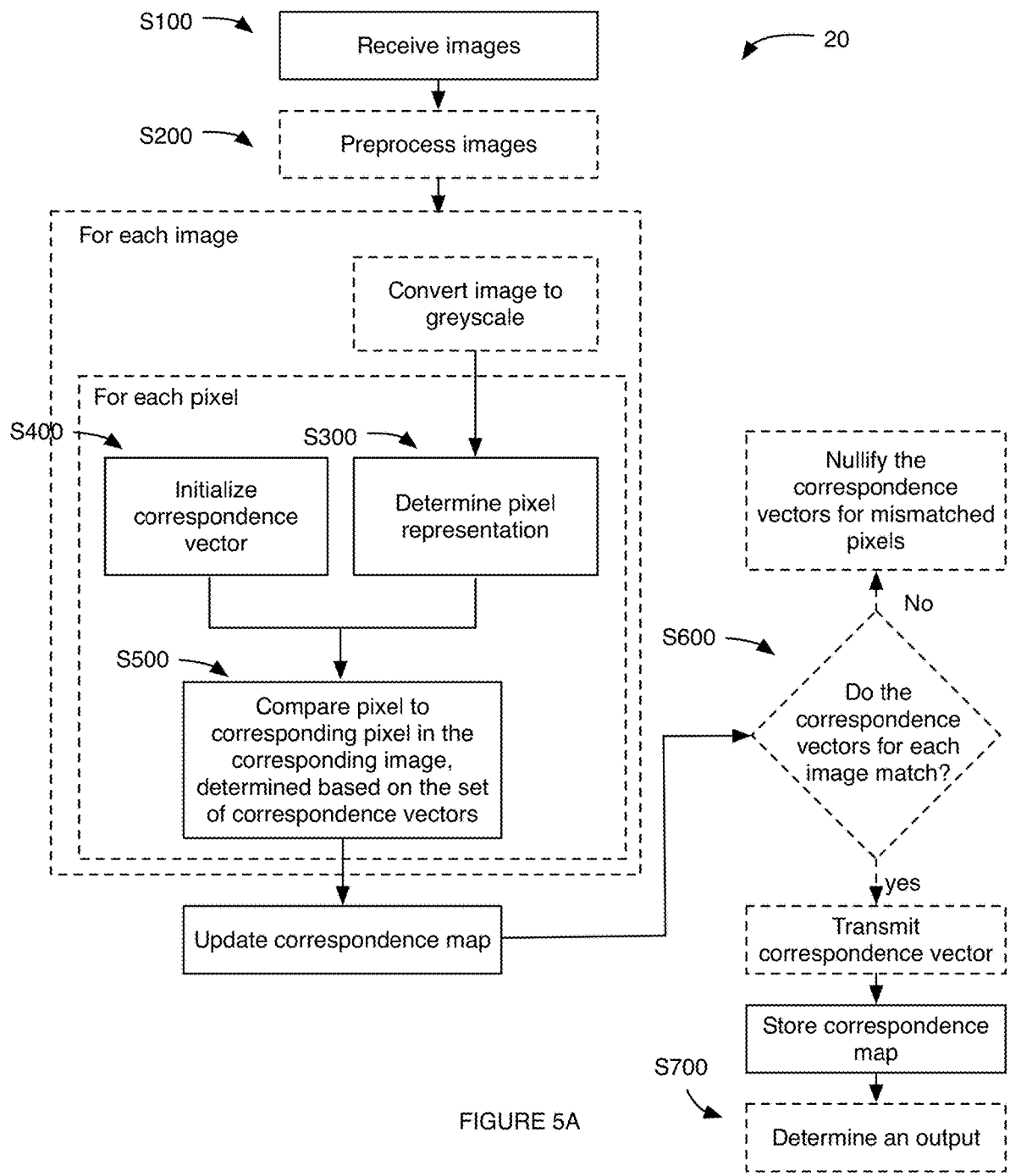
FIG. 5A is a schematic representation of an example flow chart of an embodiment of the method.
Figure 5B:
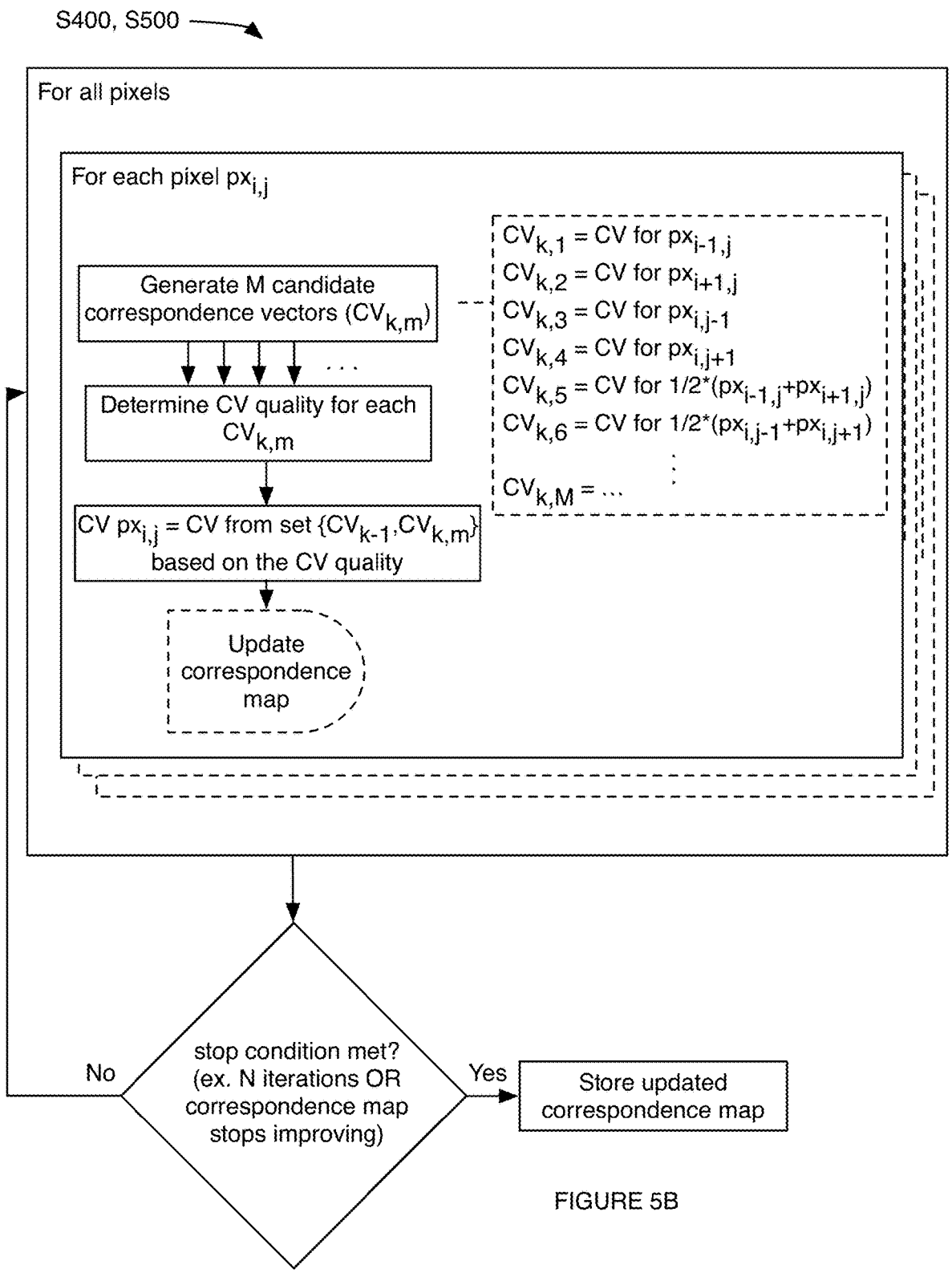
FIG. 5B is a schematic representation of an example flow chart of determining the set of correspondence vectors and evaluating a cost value.
Figure 6A:
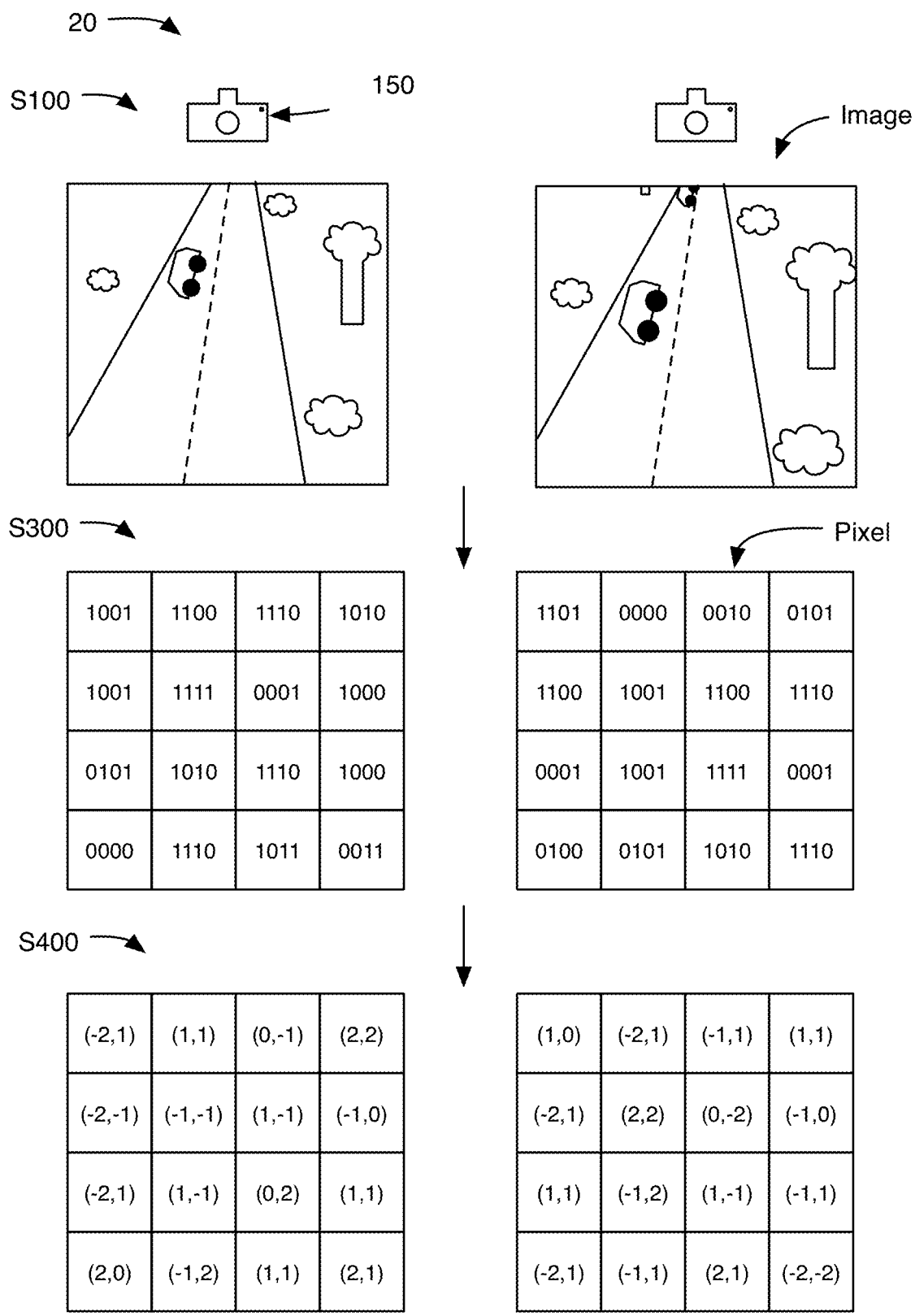
FIGS. 6A and 6B are schematic representations of an example data flow of an embodiment of the method.
Figure 6B:
Figure 6B:
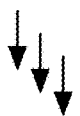
Figure 6B:
Figure 6B:
Figure 9:
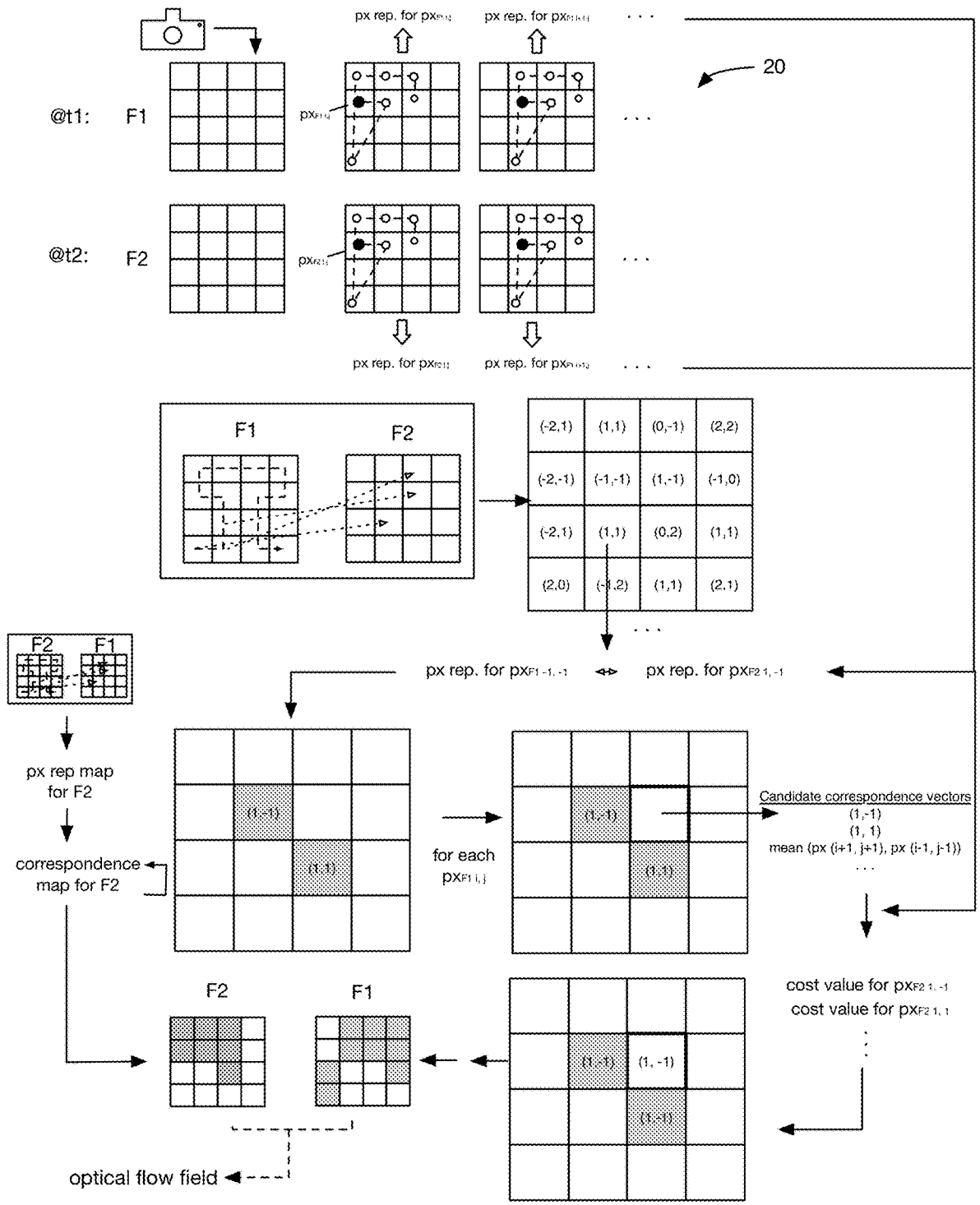
FIG. 9 is an illustrative example of the method.

In a specific example, as shown in FIGS. 5A, 5B, and 9, the method can include acquiring two images (e.g., consecutive frames of a video, stereo image pair, etc.). Each pixel from each image can be converted to a bit string. The bit string for an analysis pixel can be determined by comparing the intensity of the analysis pixel to each of a set of bit string pixels, wherein the bit string pixels are determined according to a low discrepancy sequence. The correspondence map for the first image can be initialized, for example by generating a correspondence vector for each pixel or using a correspondence map from a prior timestep. The correspondence vector for each pixel can be generated, for example, using a Halton sequence, and can be assigned to each pixel along a correspondence vector assignment path. The pixels from the first image can then be compared to pixels from the second image (e.g., by determining a Hamming distance between the bit string associated with each pixel), wherein the pixel in the second image is specified by the correspondence vector. The cost for each of the correspondence vectors can be stored. The correspondence map can be updated by generating new correspondence vector estimates (e.g., candidate correspondence vectors) for each of the pixels from the image based on the correspondence vectors for adjacent pixels neighboring the respective pixel. The pixel comparison and correspondence map updating can be iteratively performed until a stop condition is met. A second correspondence map can be determined for pixels of the second image (e.g., compared to the pixels of the first image) in a similar manner to first correspondence map determination. The second correspondence map can be determined concurrently, serially, or in any other suitable order relative to determination of the first correspondence map. If the second correspondence map matches the first correspondence map (e.g., based on a validation criterion), then the matching correspondence map (or portions thereof) can be stored, and/or used to determine one or more outputs.

This specific example can optionally include refining the correspondence map to generate a sub-pixel accurate correspondence map. This can include initializing the sub-pixel correspondence map with the integer-accurate correspondence map (e.g., generated above). The integer-accurate map can be dense, complete (e.g., output by a neural network), or otherwise completed. The corresponding pixel in the opposing image can be determined for each analysis pixel in the analysis image based on the analysis pixel's correspondence vector in the integer-accurate correspondence map. The pixels neighboring the corresponding pixel can be identified. A secondary pixel representation can be calculated for each of the analysis pixel and the neighboring corresponding pixels (e.g., on the fly, after identification). The secondary pixel representation is determined using an integer string or floating string representation (e.g., be a string of differences), using the same or different hashing walk from that used to determine the pixel representations for the integer-accurate correspondence map (e.g., determined using a second instance of S300). A sub-pixel point between the neighboring pixels is then calculated by minimizing the cost function comparing the secondary pixel representation of the analysis pixel with the secondary pixel representations of the neighboring corresponding pixels. The correspondence vector for the analysis pixel is then updated with the correspondence vector identifying the sub-pixel point.

In a second illustrative example as shown in FIG. 5A and FIG. 5B, the method includes: receiving an image set including a first and second image (e.g., sampled at a first and second timestamp, respectively); for each pixel of each image, determining a pixel representation (e.g., bit string) associated with the pixel (e.g., using a hashing walk); initializing a correspondence map for the first image, wherein the correspondence map includes a correspondence vector for each pixel within the image, wherein the correspondence vector maps the respective analysis pixel to a corresponding pixel in the other image (e.g., stores the pixel differences between the analysis pixel coordinates and the corresponding pixel's coordinates); determining a cost associated for each correspondence vector (e.g., by computing a Hamming distance based on the respective pixels' bit strings); and iteratively refining the pixel assignments (e.g., the correspondence vectors) until a predetermined condition is met (e.g., the Hamming distances for all pixels fall below a threshold, predetermined number of iterations, etc.) to generate a first correspondence map for the first image. The method can optionally determine a second correspondence map for the second image in a similar manner, and comparing the first and second correspondence maps to generate a common correspondence map, wherein the common correspondence map includes the pixels from the first and second images having matching (opposing) correspondence vectors. The method can optionally include determining an optical flow field based on the common correspondence map (and the first and second timestamps). The method can optionally include determining a motion field based on the optical flow field. In examples, the method can apply methods disclosed in U.S. application Ser. No. 15/479,101 filed 31 Jul. 2019, incorporated herein in its entirety by this reference, across sequential frames instead of or in addition to concurrently sampled images.

Figure 4:
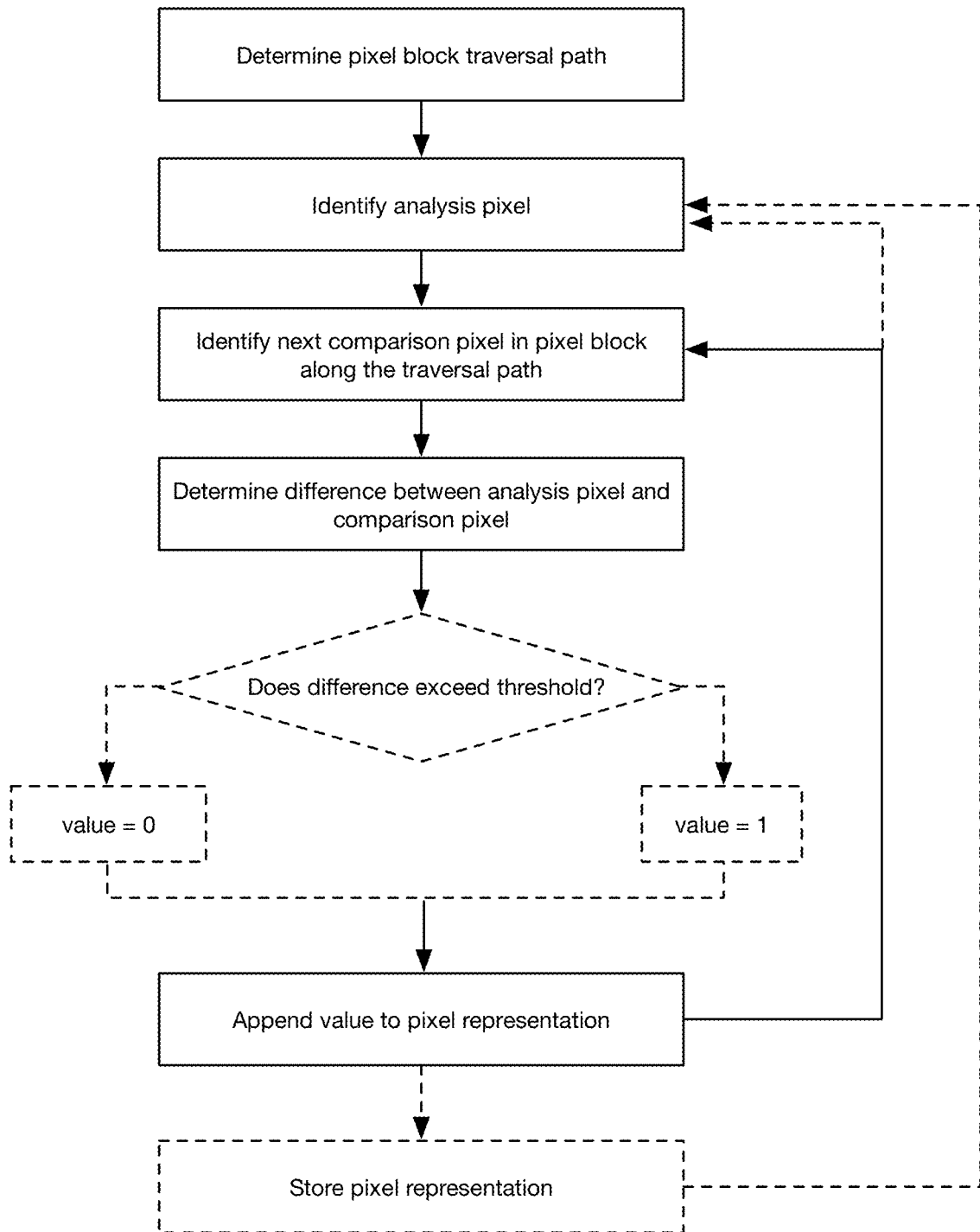
FIG. 4 is a schematic representation of an example of a flow chart of determining a pixel representation.

In variants, as shown in FIG. 4B, iteratively refining the pixel assignments can include: for each pixel, determining a set of candidate correspondence vectors; determining a cost or score (e.g., calculating a Hamming distance) for each candidate correspondence (e.g., based on the bit string of the analysis pixel and the bit string of the candidate corresponding pixel); and assigning the candidate correspondence associated with the best score or cost (e.g., lowest Hamming distance) from the current or a previous iteration to the analysis pixel for the current iteration. Iterative refinement is preferably performed on the image as a whole; however, in variants, iterative refinement can be performed on pieces of the image. For example, iterative refinement can be performed based on prior semantic segmentation for each image, wherein the pixels within each segment (e.g., object) are iteratively refined, independent of other segments.

The set of candidate correspondences can include: correspondence vectors from neighboring pixels (e.g., with valid correspondences, invalid correspondences, from immediately neighboring pixels, from pixels separated from the analysis pixel by a predetermined number of pixels, etc.); interpolated (e.g., mean) correspondence vectors from a set of predetermined interpolation pixels (e.g., pixel pairs) surrounding the analysis pixel (e.g., mean correspondence vector between: the right and left pixels, top and bottom pixels, diagonally opposing pixels, pixels symmetrically arranged about the analysis pixel, pixels within a predetermined distance of the analysis pixel, etc.); the correspondence vector from a prior iteration step; and/or any other suitable correspondence determined in any other suitable manner.

The methods of the preferred embodiment and variations thereof can be embodied and/or implemented at least in part as a machine configured to receive a nonvolatile and/or non-transitory computer-readable storage medium storing computer-readable (e.g., executable computer program) instructions. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising:
   determining a pixel hash for each pixel in a first image and each pixel in a second image;
   generating a set of initial correspondence vectors using a low discrepancy sequence;
   assigning each initial correspondence vector of the set of initial correspondence vectors to a pixel of the first image in an order determined by a space filling curve; and
   determining a correspondence map relating matching pixels in the first and second images by iteratively:
   determining a set of correspondence vectors for each pixel in the first image based on correspondence vectors of neighboring pixels, wherein each correspondence vector identifies a corresponding pixel in the second image that is paired with the respective pixel; and selecting the correspondence vector from the set based on a cost value determined between the pixel hashes of the paired pixels.

2. The method of claim 1, wherein the set of correspondence vectors for an analysis pixel comprise at least one of:
an average between the correspondence vector of a right and left neighboring pixel of the analysis pixel; or
an average correspondence vector between the correspondence vector of a neighboring pixel above and a neighboring pixel below the analysis pixel.

3. The method of claim 2, wherein the pixel to the right, the pixel the left, the pixel above, and the pixel below the analysis pixel are within a predetermined number of pixels of the analysis pixel, wherein the predetermined number is selected using a low discrepancy sequence.

4. The method of claim 1, further comprising validating the correspondence map by determining a second correspondence map relating pixels in the second image to pixels in the first image; wherein the validated correspondence map comprises correspondence vectors from the correspondence map that are within a predetermined threshold of the correspondence vectors from the second correspondence map.

5. The method of claim 1, further comprising determining a depth map based on the correspondence map.

6. The method of claim 1, further comprising filling gaps in the correspondence map by providing the correspondence map and one of the first or second image to a neural network.

7. The method of claim 1, wherein the first and second image are associated with a first and second timestamp respectively.

8. The method of claim 1, wherein the correspondence map comprises an integer-accurate correspondence map, the method further comprising refining the integer-accurate correspondence map.

9. The method of claim 8, wherein refining the integer-accurate correspondence map comprises determining a subpixel correspondence map between the first and second image by:
generating a second pixel hash for each pixel of the first image and each pixel of the second image; and
minimizing a sub-pixel cost value computed between an analysis pixel and pixels neighboring the paired pixel identified by the integer-accurate correspondence map.

10. The method of claim 9, wherein generating the second pixel hash for each pixel comprises:
traversing a pixel patch proximal the respective pixel in an ordered path beginning at the respective pixel, wherein the ordered path comprises a low-discrepancy sequence;
for each traversed patch pixel in the pixel patch:
computing a difference between the patch pixel and a preceding pixel in the order; and
updating the second pixel hash with the difference between the patch pixel and the preceding pixel.

11. The method of claim 1, wherein the set of initial correspondences further comprises a previous correspondence map associated with a frame acquired prior to the first and second image.

12. A non-transitory computer-readable storage medium storing executable computer program instructions for determining a correspondence map relating matching pixels in a first and second image, comprising:
receiving the first and second image;
for each pixel of the first image and each pixel of the second image, generating a pixel hash by:
traversing a pixel patch proximal the respective pixel in a low-discrepancy sequence beginning at the respective pixel; and
updating the pixel hash based on a difference between each patch pixel and a preceding pixel in the low-discrepancy order; and
determining the correspondence map by iteratively:
determining a set of correspondence vectors for each pixel in the first image, wherein each correspondence vector identifies a corresponding pixel in the second image that is paired with the respective pixel, and
selecting the correspondence vector from the set based on a cost value determined between the pixel hashes of the paired pixels.

13. The computer-readable storage medium of claim 12, further storing computer program instructions for:
generating an enhanced pixel hash for each pixel of the first image and each pixel of the second image; and
determining a subpixel correspondence map responsive to a subpixel cost metric determined based on:
the enhanced pixel hash associated with an analysis pixel, and
the enhanced pixel hash for pixels adjacent to the corresponding pixel determined from the correspondence map.

14. The computer-readable storage medium of claim 13, wherein the pixel hash comprises a binary hash and wherein the enhanced pixel hash comprises a nonbinary hash.

15. The computer-readable storage medium of claim 12, wherein the set of correspondence vectors comprises at least one of:
an initial correspondence vector;
a prior correspondence vector; or
a correspondence vector determined based on one or more neighboring pixels of the analysis pixel.

16. The computer-readable storage medium of claim 12, wherein the low-discrepancy order comprises a Halton walk of pixels of the pixel patch.

17. The computer-readable storage medium of claim 12, further storing computer program instructions for:
determining a depth map based on the correspondence map and parameters of an image acquisition system that acquired the first and second image.

18. The computer-readable storage medium of claim 12, wherein a portion of the first or second image is substantially featureless.

19. The computer-readable storage medium of claim 12, wherein the first and second image are associated with a first and second timestamp, respectively.

20. A method comprising:
determining a pixel hash for each pixel in a first image and each pixel in a second image; and
determining a correspondence map relating matching pixels in the first and second images by iteratively:
determining a set of correspondence vectors for each pixel in the first image based on correspondence vectors of neighboring pixels, wherein each correspondence vector identifies a corresponding pixel in the second image that is paired with the respective pixel, wherein the set of correspondence vectors for an analysis pixel comprise at least one of an average between the correspondence vector of a right and left neighboring pixel of the analysis pixel or an average correspondence vector between the correspondence vector of a neighboring pixel above and a neighboring pixel below the analysis pixel, wherein the pixel to the right, the pixel the left, the pixel above, and the pixel below the analysis pixel are within a predetermined number of pixels of the analysis pixel, wherein the predetermined number is selected using a low discrepancy sequence; and selecting the correspondence vector from the set based on a cost value determined between the pixel hashes of the paired pixels.

\* \* \* \* \*

UNITED STATES PATENT AND TRADEMARK OFFICE
CERTIFICATE OF CORRECTION

PATENT NO. : 11,651,581 B2
APPLICATION NO. : 17/246235
DATED : May 16, 2023
INVENTOR(S) : Jason Devitt, Haoyang Wang and Konstantin Azarov It is certified that error appears in the above-identified patent and that said Letters Patent is hereby corrected as shown below:

On the Title Page

Column 1, (71) Applicant, Line 1, after "Eye", insert --,--

Signed and Sealed this
Twenty-fifth Day of July, 2023

Katherine Kelly Vidal
*Director of the United States Patent and Trademark Office*